(12) United States Patent
Kimura et al.

(10) Patent No.: US 11,744,677 B2
(45) Date of Patent: Sep. 5, 2023

(54) ARCH ADJUSTMENT APPLIANCE

(71) Applicant: Align Technology, Inc., San Jose, CA (US)

(72) Inventors: Ryan Kimura, San Jose, CA (US); John Morton, San Jose, CA (US); Richard Shaw, Morgan Hill, CA (US); Chunhua Li, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 537 days.

(21) Appl. No.: 16/659,442

(22) Filed: Oct. 21, 2019

(65) Prior Publication Data

US 2020/0046463 A1 Feb. 13, 2020

Related U.S. Application Data

(62) Division of application No. 14/850,305, filed on Sep. 10, 2015, now Pat. No. 10,449,016.

(60) Provisional application No. 62/052,893, filed on Sep. 19, 2014.

(51) Int. Cl.
*A61C 7/10* (2006.01)
*A61C 7/08* (2006.01)
*A61C 7/00* (2006.01)

(52) U.S. Cl.
CPC ................ *A61C 7/10* (2013.01); *A61C 7/002* (2013.01); *A61C 7/08* (2013.01)

(58) Field of Classification Search
CPC .............. A61C 7/08; A61C 7/10; A61C 7/002
See application file for complete search history.

(56) References Cited

U.S. PATENT DOCUMENTS

| | | |
|---|---|---|
| 2,098,867 A | 11/1937 | Baxter |
| 2,171,695 A | 9/1939 | Harper |
| 2,194,790 A | 3/1940 | Jeno et al. |
| 2,467,432 A | 4/1949 | Kesling |
| 2,531,222 A | 11/1950 | Kesling |
| 2,818,065 A | 12/1957 | Freed |
| 3,089,487 A | 5/1963 | Enicks et al. |
| 3,092,907 A | 6/1963 | Traiger |

(Continued)

FOREIGN PATENT DOCUMENTS

| | | |
|---|---|---|
| AU | 517102 B | 11/1977 |
| AU | 3031677 A | 11/1977 |

(Continued)

OTHER PUBLICATIONS

US 8,553,966 B1, 10/2013, Alpern et al. (withdrawn)

(Continued)

*Primary Examiner* — Nicholas D Lucchesi
(74) *Attorney, Agent, or Firm* — Shay Glenn LLP

(57) ABSTRACT

The present disclosure provides method, systems, and devices for adjusting an arch of teeth. An appliance includes a removable shell formed of a first material having a number of cavities formed therein, wherein the number of cavities are shaped to receive teeth of a patient, and an arch element extending from the removable shell in a lingual direction and across at least a portion of the arch width of the removable shell, wherein the arch element is designed to expand an arch of the teeth of the patient, wherein the arch element has a width specific to a stage of a treatment plan.

25 Claims, 16 Drawing Sheets

(56) References Cited

U.S. PATENT DOCUMENTS

| | | |
|---|---|---|
| 3,162,948 A | 12/1964 | Gerber |
| 3,178,820 A | 4/1965 | Kesling |
| 3,211,143 A | 10/1965 | Grossberg |
| 3,277,892 A | 10/1966 | Tepper |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling et al. |
| 3,738,005 A | 6/1973 | Cohen et al. |
| 3,797,115 A | 3/1974 | Cohen et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | Mcnall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger et al. |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | Von |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,592,725 A | 6/1986 | Goshgarian |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,901,737 A | 2/1990 | Tootle |
| 4,932,866 A | 6/1990 | Guis |
| 4,935,635 A | 6/1990 | O'Harra |
| 4,936,862 A | 6/1990 | Walker et al. |
| 4,937,392 A | 6/1990 | Imanari et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,976,614 A | 12/1990 | Tepper |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A * | 10/1991 | Abbatte .......... A61C 7/146 433/24 |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,312,247 A | 5/1994 | Sachdeva et al. |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,354,201 A | 10/1994 | Wilson et al. |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |

(56) References Cited

U.S. PATENT DOCUMENTS

| | | |
|---|---|---|
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Shotsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,142,780 A * | 11/2000 | Burgio ............... A61C 19/063 433/80 |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | De Josselin De Jong et al. |
| 6,238,745 B1 | 5/2001 | Morita et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto et al. |
| 6,299,438 B1 * | 10/2001 | Sahagian ............... A61C 7/20 433/7 |
| 6,299,440 B1 | 10/2001 | Phan et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | Von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |

(56) References Cited

U.S. PATENT DOCUMENTS

| | | | |
|---|---|---|---|
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 * | 6/2003 | Phan ................ A61C 7/08 433/18 |
| 6,573,998 B2 | 6/2003 | Cohen-Sabban |
| 6,574,561 B2 | 6/2003 | Alexander et al. |
| 6,578,003 B1 | 6/2003 | Camarda |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers, Jr. |
| 6,594,539 B1 | 7/2003 | Geng |
| 6,595,342 B1 | 7/2003 | Maritzen et al. |
| 6,597,934 B1 | 7/2003 | De Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 * | 3/2004 | Phan ................ A61C 7/08 |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 * | 12/2004 | Knopp ................ B29C 43/56 433/18 |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,077,646 B2 * | 7/2006 | Hilliard ................ A61C 7/00 433/18 |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,168,950 B2 * | 1/2007 | Cinader, Jr. .......... A61C 7/146 433/80 |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 * | 3/2009 | Williams ................ A61C 7/10 433/7 |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |

(56) References Cited

U.S. PATENT DOCUMENTS

| | | |
|---|---|---|
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Muller |
| 7,695,327 B2 | 4/2010 | Bauerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Korner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | De Josselin De Jong et al. |
| 7,828,601 B2 | 11/2010 | Pyczak |
| 7,841,464 B2 | 11/2010 | Cinader, Jr. et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison, III |
| 8,201,560 B2 | 6/2012 | Dembro |
| 8,215,312 B2 | 7/2012 | Garabadian et al. |
| 8,240,018 B2 | 8/2012 | Walter et al. |
| 8,272,866 B2 * | 9/2012 | Chun ................... A61C 7/08 433/6 |
| 8,275,180 B2 | 9/2012 | Kuo |
| 8,279,450 B2 | 10/2012 | Oota et al. |
| 8,292,617 B2 * | 10/2012 | Brandt ................... A61C 7/08 433/22 |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,886,702 B2 | 11/2014 | Hering et al. |
| 8,899,976 B2 | 12/2014 | Chen et al. |
| 8,936,463 B2 | 1/2015 | Mason et al. |
| 8,948,482 B2 | 2/2015 | Levin |
| 8,956,058 B2 | 2/2015 | Rosch |
| 8,992,216 B2 | 3/2015 | Karazivan |
| 9,022,792 B2 | 5/2015 | Sticker et al. |
| 9,039,418 B1 | 5/2015 | Rubbert |
| 9,084,535 B2 | 7/2015 | Girkin et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,336,336 B2 | 5/2016 | Deichmann et al. |
| 9,351,810 B2 | 5/2016 | Moon |
| 9,375,300 B2 | 6/2016 | Matov et al. |
| 9,381,810 B2 | 7/2016 | Nelson et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |

(56) References Cited

U.S. PATENT DOCUMENTS

| | | | |
|---|---|---|---|
| 9,463,287 B1 | 10/2016 | Lorberbaum et al. | |
| 9,492,243 B2 | 11/2016 | Kuo | |
| 9,500,635 B2 | 11/2016 | Islam | |
| 9,506,808 B2 | 11/2016 | Jeon et al. | |
| 9,510,918 B2 | 12/2016 | Sanchez | |
| 9,545,331 B2 | 1/2017 | Ingemarsson-Matzen | |
| 9,584,771 B2 | 2/2017 | Mandelis et al. | |
| 9,610,141 B2 * | 4/2017 | Kopelman | A61C 7/002 |
| 9,675,427 B2 * | 6/2017 | Kopelman | A61C 7/08 |
| 9,675,430 B2 | 6/2017 | Verker et al. | |
| 9,693,839 B2 | 7/2017 | Atiya et al. | |
| 9,730,769 B2 | 8/2017 | Chen et al. | |
| 9,744,006 B2 | 8/2017 | Ross | |
| 9,795,461 B2 | 10/2017 | Kopelman et al. | |
| 9,848,985 B2 | 12/2017 | Yang et al. | |
| 9,861,451 B1 | 1/2018 | Davis | |
| 9,936,186 B2 | 4/2018 | Jesenko et al. | |
| 10,123,706 B2 | 11/2018 | Elbaz et al. | |
| 10,130,445 B2 | 11/2018 | Kopelman et al. | |
| 10,154,889 B2 | 12/2018 | Chen et al. | |
| 10,159,541 B2 | 12/2018 | Bindayel | |
| 10,231,801 B2 | 3/2019 | Korytov et al. | |
| 10,248,883 B2 | 4/2019 | Borovinskih et al. | |
| 10,258,432 B2 | 4/2019 | Webber | |
| 10,390,913 B2 | 8/2019 | Sabina et al. | |
| 10,449,016 B2 | 10/2019 | Kimura et al. | |
| 10,517,482 B2 | 12/2019 | Sato et al. | |
| 10,585,958 B2 | 3/2020 | Elbaz et al. | |
| 10,606,911 B2 | 3/2020 | Elbaz et al. | |
| 10,639,134 B2 | 5/2020 | Shanjani et al. | |
| 10,813,720 B2 | 10/2020 | Grove et al. | |
| 10,813,727 B2 | 10/2020 | Sabina et al. | |
| 10,980,613 B2 | 4/2021 | Shanjani et al. | |
| 2001/0002310 A1 * | 5/2001 | Chishti | A61B 6/466 |
| | | | 433/213 |
| 2001/0032100 A1 | 10/2001 | Mahmud et al. | |
| 2001/0038705 A1 | 11/2001 | Rubbert et al. | |
| 2001/0041320 A1 | 11/2001 | Phan et al. | |
| 2001/0054231 A1 | 12/2001 | Miller et al. | |
| 2002/0004727 A1 | 1/2002 | Knaus et al. | |
| 2002/0007284 A1 | 1/2002 | Schurenberg et al. | |
| 2002/0010568 A1 | 1/2002 | Rubbert et al. | |
| 2002/0015934 A1 | 2/2002 | Rubbert et al. | |
| 2002/0025503 A1 | 2/2002 | Chapoulaud et al. | |
| 2002/0026105 A1 | 2/2002 | Drazen | |
| 2002/0028417 A1 | 3/2002 | Chapoulaud et al. | |
| 2002/0035572 A1 | 3/2002 | Takatori et al. | |
| 2002/0064752 A1 | 5/2002 | Durbin et al. | |
| 2002/0064759 A1 | 5/2002 | Durbin et al. | |
| 2002/0087551 A1 | 7/2002 | Hickey et al. | |
| 2002/0107853 A1 | 8/2002 | Hofmann et al. | |
| 2002/0188478 A1 | 12/2002 | Breeland et al. | |
| 2002/0192617 A1 | 12/2002 | Phan et al. | |
| 2003/0000927 A1 | 1/2003 | Kanaya et al. | |
| 2003/0009252 A1 | 1/2003 | Pavlovskaia et al. | |
| 2003/0019848 A1 | 1/2003 | Nicholas et al. | |
| 2003/0021453 A1 | 1/2003 | Weise et al. | |
| 2003/0035061 A1 | 2/2003 | Iwaki et al. | |
| 2003/0049581 A1 | 3/2003 | Deluke | |
| 2003/0057192 A1 | 3/2003 | Patel | |
| 2003/0059736 A1 | 3/2003 | Lai et al. | |
| 2003/0060532 A1 | 3/2003 | Subelka et al. | |
| 2003/0068598 A1 | 4/2003 | Vallittu et al. | |
| 2003/0095697 A1 | 5/2003 | Wood et al. | |
| 2003/0101079 A1 | 5/2003 | Mclaughlin | |
| 2003/0103060 A1 | 6/2003 | Anderson et al. | |
| 2003/0120517 A1 | 6/2003 | Eida et al. | |
| 2003/0139834 A1 | 7/2003 | Nikolskiy et al. | |
| 2003/0144886 A1 | 7/2003 | Taira | |
| 2003/0172043 A1 | 9/2003 | Guyon et al. | |
| 2003/0190575 A1 | 10/2003 | Hilliard | |
| 2003/0192867 A1 | 10/2003 | Yamazaki et al. | |
| 2003/0198911 A1 * | 10/2003 | Knopp | A61C 7/08 |
| | | | 433/24 |
| 2003/0207224 A1 | 11/2003 | Lotte | |
| 2003/0215764 A1 | 11/2003 | Kopelman et al. | |
| 2003/0224311 A1 | 12/2003 | Cronauer | |
| 2003/0224313 A1 | 12/2003 | Bergersen | |
| 2003/0224314 A1 | 12/2003 | Bergersen | |
| 2004/0002873 A1 | 1/2004 | Sachdeva | |
| 2004/0009449 A1 | 1/2004 | Mah et al. | |
| 2004/0013994 A1 | 1/2004 | Goldberg et al. | |
| 2004/0013996 A1 | 1/2004 | Sapian | |
| 2004/0019262 A1 | 1/2004 | Perelgut | |
| 2004/0029078 A1 | 2/2004 | Marshall | |
| 2004/0038168 A1 | 2/2004 | Choi et al. | |
| 2004/0054304 A1 | 3/2004 | Raby | |
| 2004/0054358 A1 | 3/2004 | Cox et al. | |
| 2004/0058295 A1 | 3/2004 | Bergersen | |
| 2004/0068199 A1 | 4/2004 | Echauz et al. | |
| 2004/0078222 A1 | 4/2004 | Khan et al. | |
| 2004/0080621 A1 | 4/2004 | Fisher et al. | |
| 2004/0094165 A1 | 5/2004 | Cook | |
| 2004/0107118 A1 | 6/2004 | Harnsberger et al. | |
| 2004/0133083 A1 | 7/2004 | Comaniciu et al. | |
| 2004/0152036 A1 | 8/2004 | Abolfathi | |
| 2004/0158194 A1 | 8/2004 | Wolff et al. | |
| 2004/0166463 A1 | 8/2004 | Wen et al. | |
| 2004/0167646 A1 | 8/2004 | Jelonek et al. | |
| 2004/0193036 A1 | 9/2004 | Zhou et al. | |
| 2004/0197728 A1 | 10/2004 | Abolfathi et al. | |
| 2004/0214128 A1 | 10/2004 | Sachdeva et al. | |
| 2004/0219479 A1 | 11/2004 | Malin et al. | |
| 2004/0220691 A1 | 11/2004 | Hofmeister et al. | |
| 2004/0229185 A1 | 11/2004 | Knopp | |
| 2004/0259049 A1 | 12/2004 | Kopelman et al. | |
| 2005/0003318 A1 | 1/2005 | Choi et al. | |
| 2005/0023356 A1 | 2/2005 | Wiklof et al. | |
| 2005/0031196 A1 | 2/2005 | Moghaddam et al. | |
| 2005/0037312 A1 | 2/2005 | Uchida | |
| 2005/0038669 A1 | 2/2005 | Sachdeva et al. | |
| 2005/0040551 A1 | 2/2005 | Biegler et al. | |
| 2005/0042569 A1 | 2/2005 | Phan et al. | |
| 2005/0042577 A1 | 2/2005 | Kvitrud et al. | |
| 2005/0048433 A1 | 3/2005 | Hilliard | |
| 2005/0074717 A1 | 4/2005 | Cleary et al. | |
| 2005/0089822 A1 | 4/2005 | Geng | |
| 2005/0100333 A1 | 5/2005 | Kerschbaumer et al. | |
| 2005/0108052 A1 | 5/2005 | Omaboe | |
| 2005/0131738 A1 | 6/2005 | Morris | |
| 2005/0144150 A1 | 6/2005 | Ramamurthy et al. | |
| 2005/0171594 A1 | 8/2005 | Machan et al. | |
| 2005/0171630 A1 | 8/2005 | Dinauer et al. | |
| 2005/0181333 A1 | 8/2005 | Karazivan et al. | |
| 2005/0186524 A1 | 8/2005 | Abolfathi et al. | |
| 2005/0186526 A1 | 8/2005 | Stewart et al. | |
| 2005/0216314 A1 | 9/2005 | Secor | |
| 2005/0233276 A1 | 10/2005 | Kopelman et al. | |
| 2005/0239013 A1 | 10/2005 | Sachdeva | |
| 2005/0244781 A1 | 11/2005 | Abels et al. | |
| 2005/0244791 A1 | 11/2005 | Davis et al. | |
| 2005/0271996 A1 | 12/2005 | Sporbert et al. | |
| 2006/0056670 A1 | 3/2006 | Hamadeh | |
| 2006/0057533 A1 | 3/2006 | Mcgann | |
| 2006/0063135 A1 | 3/2006 | Mehl | |
| 2006/0078842 A1 | 4/2006 | Sachdeva et al. | |
| 2006/0084024 A1 | 4/2006 | Farrell | |
| 2006/0093982 A1 | 5/2006 | Wen | |
| 2006/0098007 A1 | 5/2006 | Rouet et al. | |
| 2006/0099545 A1 | 5/2006 | Lai et al. | |
| 2006/0099546 A1 | 5/2006 | Bergersen | |
| 2006/0110698 A1 | 5/2006 | Robson | |
| 2006/0111631 A1 | 5/2006 | Kelliher et al. | |
| 2006/0115785 A1 | 6/2006 | Li et al. | |
| 2006/0137813 A1 | 6/2006 | Robrecht et al. | |
| 2006/0147872 A1 | 7/2006 | Andreiko | |
| 2006/0154198 A1 | 7/2006 | Durbin et al. | |
| 2006/0154207 A1 | 7/2006 | Kuo | |
| 2006/0173715 A1 | 8/2006 | Wang | |
| 2006/0183082 A1 | 8/2006 | Quadling et al. | |
| 2006/0188834 A1 | 8/2006 | Hilliard | |
| 2006/0188848 A1 | 8/2006 | Tricca et al. | |
| 2006/0194163 A1 | 8/2006 | Tricca et al. | |
| 2006/0199153 A1 | 9/2006 | Liu et al. | |

(56) References Cited

U.S. PATENT DOCUMENTS

| | | |
|---|---|---|
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0037111 A1 | 2/2007 | Mailyan |
| 2007/0037112 A1 | 2/2007 | Mailyan |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1* | 10/2007 | Phan ............... A61C 19/003 433/6 |
| 2007/0238065 A1 | 10/2007 | Sherwood et al. |
| 2007/0239488 A1 | 10/2007 | Derosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0050692 A1* | 2/2008 | Hilliard ............... A61C 7/08 433/24 |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0182220 A1* | 7/2008 | Chishti ............... A61C 7/08 433/24 |
| 2008/0233530 A1 | 9/2008 | Cinader |
| 2008/0242144 A1 | 10/2008 | Dietz |
| 2008/0248443 A1* | 10/2008 | Chishti ............... G06T 17/00 433/24 |
| 2008/0254402 A1 | 10/2008 | Hilliard |
| 2008/0254403 A1 | 10/2008 | Hilliard |
| 2008/0268400 A1 | 10/2008 | Moss et al. |
| 2008/0289637 A1 | 11/2008 | Wyss |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kass et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0208897 A1* | 8/2009 | Kuo ............... A61C 7/08 433/215 |
| 2009/0210032 A1 | 8/2009 | Beiski et al. |
| 2009/0218514 A1 | 9/2009 | Klunder et al. |
| 2009/0280450 A1* | 11/2009 | Kuo ............... A61C 7/08 433/9 |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0047732 A1 | 2/2010 | Park |
| 2010/0062394 A1 | 3/2010 | Jones et al. |
| 2010/0068676 A1 | 3/2010 | Mason et al. |
| 2010/0075268 A1 | 3/2010 | Duran Von Arx |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Maifliet et al. |
| 2010/0152599 A1 | 6/2010 | Duhamel et al. |
| 2010/0165275 A1 | 7/2010 | Tsukamoto et al. |
| 2010/0167225 A1 | 7/2010 | Kuo |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader, Jr. et al. |
| 2010/0279245 A1* | 11/2010 | Navarro ............... A61C 7/08 433/10 |
| 2010/0280798 A1 | 11/2010 | Pattijn et al. |
| 2010/0281370 A1 | 11/2010 | Rohaly et al. |
| 2010/0303316 A1 | 12/2010 | Bullis et al. |
| 2010/0312484 A1 | 12/2010 | Duhamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0020761 A1* | 1/2011 | Kalili ............... A61C 7/08 433/214 |
| 2011/0027743 A1 | 2/2011 | Cinader, Jr. et al. |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |

(56) References Cited

U.S. PATENT DOCUMENTS

| | | |
|---|---|---|
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0240064 A1 | 10/2011 | Wales et al. |
| 2011/0262881 A1 | 10/2011 | Mauclaire |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizu et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286114 A1 | 10/2013 | Ito et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0100495 A1 | 4/2014 | Haseley |
| 2014/0106289 A1 | 4/2014 | Kozlowski |
| 2014/0122027 A1 | 5/2014 | Andreiko et al. |
| 2014/0142902 A1 | 5/2014 | Chelnokov et al. |
| 2014/0170591 A1 | 6/2014 | El-Siblani |
| 2014/0178829 A1 | 6/2014 | Kim |
| 2014/0186794 A1 | 7/2014 | Deichmann et al. |
| 2014/0220520 A1 | 8/2014 | Salamini |
| 2014/0265034 A1 | 9/2014 | Dudley |
| 2014/0272774 A1 | 9/2014 | Dillon et al. |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342299 A1 | 11/2014 | Jung |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0031940 A1 | 1/2015 | Floyd |
| 2015/0079530 A1 | 3/2015 | Bergersen |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1* | 6/2015 | Lowe .................. A61C 7/00 433/2 |
| 2015/0182303 A1 | 7/2015 | Abraham et al. |
| 2015/0216626 A1 | 8/2015 | Ranjbar |
| 2015/0216716 A1 | 8/2015 | Anitua |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0257856 A1* | 9/2015 | Martz .................. A61C 7/145 433/6 |
| 2015/0306486 A1 | 10/2015 | Logan et al. |
| 2015/0320320 A1 | 11/2015 | Kopelman et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051341 A1* | 2/2016 | Webber ................. A61C 7/08 703/1 |
| 2016/0051345 A1 | 2/2016 | Levin |
| 2016/0064898 A1 | 3/2016 | Atiya et al. |
| 2016/0135924 A1 | 5/2016 | Choi et al. |
| 2016/0135925 A1 | 5/2016 | Mason et al. |
| 2016/0157962 A1 | 6/2016 | Kim et al. |
| 2016/0163115 A1 | 6/2016 | Furst |
| 2016/0193014 A1* | 7/2016 | Morton ................ A61C 7/08 433/24 |
| 2016/0217708 A1 | 7/2016 | Levin et al. |
| 2016/0220105 A1 | 8/2016 | Duret |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242811 A1 | 8/2016 | Sadiq et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0328843 A1 | 11/2016 | Graham et al. |
| 2016/0346063 A1 | 12/2016 | Schulhof et al. |
| 2016/0367188 A1 | 12/2016 | Malik et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0049326 A1 | 2/2017 | Alfano et al. |
| 2017/0056131 A1 | 3/2017 | Alauddin et al. |
| 2017/0079747 A1 | 3/2017 | Graf et al. |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0105816 A1* | 4/2017 | Ward .................. A61C 7/146 |
| 2017/0105817 A1* | 4/2017 | Chun .................. A61C 7/10 |
| 2017/0135792 A1 | 5/2017 | Webber |
| 2017/0135793 A1 | 5/2017 | Webber et al. |
| 2017/0165032 A1 | 6/2017 | Webber et al. |
| 2017/0196727 A1 | 7/2017 | Giridharagopalan |
| 2017/0215739 A1 | 8/2017 | Miyasato |
| 2017/0231722 A1* | 8/2017 | Boronkay ............. A61C 7/08 433/6 |
| 2017/0251954 A1 | 9/2017 | Lotan et al. |
| 2017/0265967 A1 | 9/2017 | Hong |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0071054 A1 | 3/2018 | Ha |

(56) References Cited

U.S. PATENT DOCUMENTS

| | | |
|---|---|---|
| 2018/0085059 A1 | 3/2018 | Lee |
| 2018/0125610 A1 | 5/2018 | Carrier, Jr. et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0200031 A1 | 7/2018 | Webber et al. |
| 2018/0228359 A1 | 8/2018 | Meyer et al. |
| 2018/0280118 A1 | 10/2018 | Cramer |
| 2018/0280125 A1 | 10/2018 | Longley et al. |
| 2018/0284727 A1 | 10/2018 | Cramer et al. |
| 2018/0318042 A1 | 11/2018 | Baek |
| 2018/0325626 A1* | 11/2018 | Huang .............. A61C 7/14 |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0019187 A1 | 1/2019 | Miller et al. |
| 2019/0021817 A1 | 1/2019 | Sato et al. |
| 2019/0026599 A1 | 1/2019 | Salah et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |
| 2019/0099129 A1 | 4/2019 | Kopelman et al. |
| 2019/0125494 A1 | 5/2019 | Li et al. |
| 2019/0152152 A1 | 5/2019 | O'Leary et al. |
| 2019/0171618 A1 | 6/2019 | Kuo |
| 2019/0175303 A1 | 6/2019 | Akopov et al. |
| 2019/0175304 A1 | 6/2019 | Morton et al. |
| 2019/0192259 A1 | 6/2019 | Kopelman et al. |
| 2019/0231477 A1 | 8/2019 | Shanjani et al. |
| 2019/0231492 A1 | 8/2019 | Sabina et al. |
| 2019/0269482 A1* | 9/2019 | Shanjani .............. G06F 3/017 |
| 2019/0314119 A1 | 10/2019 | Kopelman et al. |
| 2019/0343606 A1* | 11/2019 | Wu .............. A61C 7/002 |
| 2020/0405451 A1 | 12/2020 | Lemchen |
| 2021/0068926 A1 | 3/2021 | Wu et al. |
| 2021/0259812 A1* | 8/2021 | O'Leary .............. A61C 7/08 |

FOREIGN PATENT DOCUMENTS

| | | |
|---|---|---|
| CA | 1121955 A1 | 4/1982 |
| CN | 201101586 Y | 8/2008 |
| CN | 101426449 A | 5/2009 |
| CN | 101442953 A | 5/2009 |
| CN | 101677842 A | 3/2010 |
| CN | 201609421 U | 10/2010 |
| CN | 203369975 U | 1/2014 |
| CN | 103889364 A | 6/2014 |
| CN | 104000662 A | 8/2014 |
| CN | 204092220 U | 1/2015 |
| CN | 104379087 A | 2/2015 |
| CN | 204863317 U | 12/2015 |
| CN | 105266907 A | 1/2016 |
| CN | 105496575 A | 4/2016 |
| CN | 105997274 A | 10/2016 |
| CN | 106667594 A | 5/2017 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 102009023357 A1 | 12/2010 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2211753 A1 | 8/2010 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | 08-508174 A | 9/1996 |
| JP | H0919443 A | 1/1997 |
| JP | 2000339468 A | 12/2000 |
| JP | 2003245289 A | 9/2003 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 20020062793 A | 7/2002 |
| KR | 20070108019 A | 11/2007 |
| KR | 20090065778 A | 6/2009 |
| KR | 101266966 B1 | 5/2013 |
| KR | 20160041632 A | 4/2016 |
| KR | 20160071127 A | 6/2016 |
| KR | 101675089 B1 | 11/2016 |
| KR | 20160133921 A | 11/2016 |
| TW | 480166 B | 3/2002 |
| WO | WO91/004713 A1 | 4/1991 |
| WO | WO-9203102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO-0108592 A1 | 2/2001 |
| WO | WO-0180762 A2 | 11/2001 |
| WO | WO-0185047 A2 | 11/2001 |
| WO | WO-0217776 A2 | 3/2002 |
| WO | WO-02062252 A1 | 8/2002 |
| WO | WO-02095475 A1 | 11/2002 |
| WO | WO03/003932 A2 | 1/2003 |
| WO | WO2006/096558 A2 | 9/2006 |
| WO | WO2006/100700 A2 | 9/2006 |
| WO | WO-2006133548 A1 | 12/2006 |
| WO | WO-2007019709 A2 | 2/2007 |
| WO | WO-2007071341 A1 | 6/2007 |
| WO | WO-2007103377 A2 | 9/2007 |
| WO | WO-2008115654 A1 | 9/2008 |
| WO | WO-2009016645 A2 | 2/2009 |
| WO | WO-2009085752 A2 | 7/2009 |
| WO | WO-2009146788 A1 | 12/2009 |
| WO | WO-2009146789 A1 | 12/2009 |
| WO | WO2010/123892 A2 | 10/2010 |
| WO | WO-2012007003 A1 | 1/2012 |
| WO | WO-2012042547 A1 | 4/2012 |
| WO | WO-2012064684 A2 | 5/2012 |
| WO | WO-2012074304 A2 | 6/2012 |
| WO | WO-2012078980 A2 | 6/2012 |
| WO | WO-2012083968 A1 | 6/2012 |
| WO | WO-2012140021 A2 | 10/2012 |

(56) References Cited

FOREIGN PATENT DOCUMENTS

| WO | WO2013/058879 A2 | 4/2013 |
|---|---|---|
| WO | WO2013/176444 A1 | 11/2013 |
| WO | WO2014/068107 A1 | 5/2014 |
| WO | WO-2014091865 A1 | 6/2014 |
| WO | WO-2014143911 A1 | 9/2014 |
| WO | WO-2015015289 A2 | 2/2015 |
| WO | WO-2015063032 A1 | 5/2015 |
| WO | WO-2015112638 A1 | 7/2015 |
| WO | WO-2015176004 A1 | 11/2015 |
| WO | WO-2016004415 A1 | 1/2016 |
| WO | WO2016/028106 A1 | 2/2016 |
| WO | WO-2016042393 A1 | 3/2016 |
| WO | WO-2016042396 A1 | 3/2016 |
| WO | WO-2016061279 A1 | 4/2016 |
| WO | WO-2016084066 A1 | 6/2016 |
| WO | WO-2016099471 A1 | 6/2016 |
| WO | WO-2016113745 A1 | 7/2016 |
| WO | WO-2016116874 A1 | 7/2016 |
| WO | WO2016/149007 A1 | 9/2016 |
| WO | WO-2016200177 A1 | 12/2016 |
| WO | WO2017/006176 A1 | 1/2017 |
| WO | WO-2017182654 A1 | 10/2017 |
| WO | WO-2018057547 A1 | 3/2018 |
| WO | WO-2018085718 A2 | 5/2018 |

OTHER PUBLICATIONS

3 Shape Trios 3, Insane speed-scanning with 3shape trios 3 intracral canner, (Screenshot), 2 pages, retrieved from the internet at You Tube (https//www.youtube.com/watch?v=X5CviUZ5DpQ&feature=youtu.be, available as of Sep. 18, 2015.

Alves R.C., et al., "New Trends in Food Allergens Detection: Toward Biosensing Strategies", Critical Reviews in Food Science and Nutrition, Mar. 2015, 18 pages.

Arakawa et al., Mouthguard biosensor with telemetry system for monitoring of saliva glucose: A novel cavitas sensor, Biosensors and Bioelectronics, Oct. 2016, 84, pp. 106-111.

Bandodkar et al., Allprinted magnetically selfhealing electrochemical devices, Science Advances, Nov. 2016, 2(11), 11 pages, e1601465.

Bandodkar et al., Self-healing inks for autonomous repair of printable electrochemical devices, Advanced Electronic Materials, Dec. 2015, 1(12), 5 pages, 1500289.

Bandodkar et al., Wearable biofuel cells: a review; Electroanalysis, Jun. 2016, 28 (6), pp. 1188-1200.

Bandodkar et al., Wearable chemical sensors: present challenges and future prospects; Acs Sensors, May 11, 2016, 1(5), pp. 464-482.

Berland, The use of smile libraries for cosmetic dentistry, Dental Tribunne: Asia pacfic Edition, Mar. 29, 2006, pp. 16 18.

Bernabe et al., Are the lower incisors the best predictors for the unerupted canine and premolars sums? An analysis of Peruvian sample, The Angle Orthodontist, Mar. 2005, 75(2), pp. 202-207.

Bookstein, Principal warps: Thin-plate splines and decomposition of deformations, IEEE Transactions on pattern analysis and machine intelligence, Jun. 1989, 11 (6), pp. 567-585.

Cadent Inc., OrthoCAD ABO user guide, 38 pages, Dec. 21, 2005.

Cadent Inc., Reviewing and modifying an orthoCAD case, 4 pages, Feb. 14, 2005.

Collins English Dictionary, Teeth (definition), 9 pages, retrieved from the internet (https://www.collinsdictionary.com/us/dictionary/english/teeth) on May 13, 2019.

Daniels et al., The development of the index of complexity outcome and need (ICON), British Journal of Orthodontics, Jun. 2000, 27(2), pp. 149-162.

Dental Monitoring, "Basics: How to put your Cheek Retractor? (Dental Monitoring Tutorial)", https://lwww.youtube.com/watch?v=6K1HXw4Kq3c, May 27, 2016.

Dental Monitoring, Dental monitoring tutdrial, 1 page (Screenshot), retrieved from the internet (https:www.youtube.com/watch?v=Dbe3ud0f9_c), Mar. 18, 2015.

Dentrix, "Dentrix G3, New Features", http://www.dentrix.com/g3/new_features/index.asp, accessed Jun. 6, 2008, 2 pgs.

Di Giacomo et al., Clinical application of sterolithographic surgical guides for implant placement: Preliminary results, Journal Periodontolgy, Apr. 2005, 76(4), pp. 503-507.

Dicom to surgical guides; (Screenshot); 1 page; retrieved from the internet at YouTube (https://youtu.be/47KtOmCEFQk); Published Apr. 4, 2016.

dictionary.com, Plural (definition), 6 pages, retrieved from the internet (https://www.dictionary.com/browse/plural#) on May 13, 2019.

dictionary.com, Quadrant (definition), 6 pages, retrieved from the internet (https://www.dictionary.com/browse/quadrant?s=t) on May 13, 2019.

Doruk et al., The role of the headgear timer in extraoral cooperation, European Journal of Orthodontics, Jun. 1, 2004, 26, pp. 289-291.

Dummer et al., Computed Radiography Imaging Based on High-Density 670 nm VCSEL Arrays, International Society for Optics and Photonics, Feb. 24, 2010., vol. 7557, p. 75570H, 7 pages, (Author Manuscript).

Eclinger Selfie, Change your smile, 1 page (screenshot), retrieved from the internet https://play.google.com/store/apps/details?id=parkelict.ecligner), on Feb. 13, 2018.

Farooq et al., Relationship between tooth dimensions and malocclusion, JPMA: The Journal of the Pakistan Medical Association, 64(6), pp. 670-674, Jun. 2014.

Friedrich et al., "Measuring system for in vivo recording of force systems in orthodontic treatment-concept and analysis of accuracy", J. Biomech., 32(1), pp. 81-85, (Abstract only) Jan. 1999.

Geomagic, Dental reconstruction, 1 page, retrieved from the internet (http://geomagic.com/en/solutions/industry/detal_desc.php) on Jun. 6, 2008.

Gottschalk et al., "OBBTree: A hierarchical structure for rapid interference detection" (http://www.cs.unc.edu/?geom/OBB/OBBT.html); relieved from the internet (https://www.cse.iitk.ac.in/users/amiUcourses/RMP/presentations/dslamba/presentation/sig96.pdf) on Apr. 25, 2019, 12 pages.

gpsdentaire.com, Get a realistic smile simulation in 4 steps with GPS, a smile management software, 10 pages, retrieved from the internet (http://www.gpsdentaire.com/en/preview/) on Jun. 6, 2008.

Grest, Daniel, Marker-Free Human Motion Capture in Dynamic Cluttered Environments from a Single View-Point:, PhD Thesis, 171 pages, 2007, Kiel, Germany, XP055320155. [retrieved on Nov. 16, 2016] Retrieved from the Internet: [http://www.grest.org/publications/thesisDanielGrest.pdf].

Hou H.M., et al., "The Uses of Orthodontic Study Models in Diagnosis and Treatment Planning", Hong Kong Dental Journal, Dec. 2006, vol. 3(2), pp. 107-115.

Imani et al., Awearable chemical-electrophysiological hybrid biosensing system for real-time health and fitness monitoring, Nature Communications, 7, 11650. doi 1038/ncomms11650, 7 pages, May 23, 2016.

Invisalign., You were made to move. There's never been a better time to straighten your teeth with the most advanced clear aligner in the world, Product webpage, 2 pages, retrieved from the internet (www.invisalign.com/) on Dec. 28, 2017.

Jeerapan et al., Stretchable biofuel cells as wearable textile-based self-powered sensors, Journal of Materials Chemistry A, 4(47), pp. 18342-18353, Dec. 21, 2016.

Karaman et al., A practical method of fabricating a lingual retainer, Am. Journal of Orthodontic and Dentofacial Orthopedics, Sep. 2003, 124(3), pp. 327-330.

Kim et al., A wearable fingernail chemical sensing platform: pH sensing at your fingertips, Taianta, 150, pp. 622-628, Apr. 2016.

Kim et al., Advanced materials for printed wearable electrochemical devices: A review, Advanced Electronic Materials, 3(1), 15 pages, 1600260, Jan. 2017.

Kim et al., Noninvasive alcohol monitoring using a wearable tatto-based iontophoretic-biosensing system, Acs Sensors, 1 (8), pp. 1011-1019, Jul. 22, 2016.

(56) References Cited

OTHER PUBLICATIONS

Kim et al., Wearable salivary uric acid mouthguard biosensor with integrated wireless electronics, Biosensors and Bioelectronics, 74, pp. 1061-1068 (Author Manuscript), Dec. 2015.
Kumar et al., All-printed, stretchable Zn—Ag2o rechargeable battery via, hyperelastic binder for self-powering wearable electronics, Advanced Energy Materials, Apr. 2017, 7(8), 8 pages, 1602096.
Kumar et al., Rapid maxillary expansion: A unique treatment modality in dentistry, J. Clin. Diagn. Res., 5(4), pp. 906-911, Aug. 2011.
Mantzikos et al., Case report: Forced eruption and implant site development, The Angle Orthodontist, 68(2), pp. 179-186, Apr. 1998.
Martinelli et al., Prediction of lower permanent canine and premolars width by correlation methods, The Angle Orthodontist, 75(5), pp. 805-808, Sep. 2005.
Methot; Get the picture with a gps for smile design in 3 steps; Spectrum; 5(4); pp. 100-105; (year of pub. sufficiently earlier than effective US filing date and any foreign priority date) 2006.
Nedelcu, Robert G., et al., "Scanning Accuracy and Precision in 4 Intraoral Scanners: An In Vitro Comparison Based on 3-Dimensional Analysis," The Journal of Prosthetic Dentistry, vol. 112, Issue 6, Dec. 1, 2014, pp. 1461-1471.
Newcombe, R., et al., DTAM: Dense Tracking and Mapping in Real-Time, Retrieved from https://www.doc.ic.ac.uk/?ajd/Publications/newcombe_etal_iccv2011.pdf, Dec. 2011, 8 pgs.
Nourallah et al., New regression equations for prediciting the size of unerupted canines and premolars in a contemporary population, The Angle Orthodontist, 72(3), pp. 216-221, Jun. 2002.
ormco.com: Increasing clinical performance with 3D interactive treatment planning and patient-specific appliances; retrieved from the internet (http://www.konsident.com/wp-contenVfiles mf/1295385693http armco. com _index_ cmsfilesystemaction fileOrmcoPDF whitepapers. pdf) on Feb. 27, 2019, 8 Pages.
OrthoCAD downloads, retrieved Jun. 27, 2012 from the internet (www.orthocad.com/download/downloads.asp), 2 pages, Feb. 14, 2005.
Paredes et al., A new, accurate and fast digital method to predict unerupted tooth size, The Angle Orthodontist, 76(1), pp. 14-19, Jan. 2006.
Parrilla et al., A textile-based stretchable multi-ion potentiometric sensor, Advanced Healthcare Materials, 5(9), pp. 996-1001, May 2016.
Patterson Dental, "Cosmetic Imaging", http://patterson.eaglesoft.net/cnt_di_cosimg.html, accessed Jun. 6, 2008, 2 pgs.
Rose T.P., et al., "The Role of Orthodontics in Implant Dentistry", British Dental Journal, vol. 201, No. 12, Dec. 23, 2006, pp. 753-764.
Rubin et al., Stress analysis of the human tooth using a three-dimensional finite element model, Journal of Dental Research, 62(2), pp. 82-86, Feb. 1983.
Sahm et al., "Micro-Electronic Monitoring of Functional Appliance Wear", Eur J Orthod., 12(3), pp. 297-301, Aug. 1990.
Sahm, "Presentation of a wear timer for the clarification of scientific questions in orthodontic orthopedics", Fortschritte der Kieferorthopadie, 51 (4), pp. 243-247, (Translation Included) Jul. 1990.
Sarment et al., "Accuracy of implant placement with a stereolithographic surgical guide", Journal of Oral and Maxillofacial Implants, 118(4), pp. 571-577, Jul. 2003.
Schafer, et al. Quantifying patient adherence during active orthodontic treatment with removable appliances using microelectronic wear-time documentation. European Journal of Orthodontics. 2014, 1-8. doi: 10.1 093/ejo/cju012, Jul. 3, 2014.
Smalley; "Implants for tooth movement Determining implant location and orientation," Journal of Esthetic and Restorative Dentistry; Mar. 1995, vol. 7(2); pp. 62-72.
Smart Technology; Smile library II; 1 page; retrieved from the internet;< http://smart-technology.net/> on Jun. 6, 2008.
Smile-Vision; "The smile-vision cosmetic imaging system"; 2 pages; Retrieved from the internet< http://www.smile-vision.net/cos_imaging.php> on Jun. 6, 2008.
Sobral De A Gular et al., The Gingival Crevicular Fluid as a Source of Biomarkers to Enhance Efficiency of Orthodontic and Functional Treatment of Growing Patients, Bio. Med. Research International, 2017, 7 Pages, Article ID 3257235, 2017.
Szeliski, Richard, "Introduction to Computer Vision: Structure from Motion", Retrieved from internet< http://robots.stanford.edu/cs223b05/notes/CS%20223-B%20L10%20structurefro-mmotion1b.ppt> Feb. 3, 2005, 64 pgs.
Thera Mon; "Microsensor"; 2 pages; retrieved from the internet (www.english.thera-mon.com/the-product/transponder/index.html); on Sep. 19, 2016.
Vevin et al.; "Pose estimation of teeth through crown-shape matching; In Medical Imaging";: Image Processing of International Society of Optics and Photonics;May 9, 2002, vol. 4684; pp. 955-965.
Virtual Orthodontics, Our innovative software,2005, 2 Pages. (http://www.virtualorthodontics.com/innovativesoftware.html), retrieved from the internet (https://web.archive.org/web/20070518085145/http://www.virtualorthodontics.com/innovativesoftware.html); (year of pub. sufficiently earlier than effective US filing date and any foreign priority date).
Wiedmann; "According to the laws of harmony to find the right tooth shape with assistance of the computer"; Digital Dental News; Apr. 2008, 2nd vol.; pp. 0005-0008.
Wikipedia; Palatal expansion; 3 pages; retrieved from the internet https: en.wikipedia.org="" wiki="" palatal_expansion=""> on Mar. 5, 2018</https:>.
Wireless Sensor Networks Magazine, "Embedded Teeth for Oral Activity Recognition", Jul. 29, 2013, 2 pages; retrieved on Sep. 19, 2016 from the internet www.wsnmagazine.com/embedded-teeth/>.
Witt et al., "The wear-timing measuring device in orthodontics-cui bono? Reflections on the state-of-the-art in wear-timing measurement and compliance research in orthodontics"; Fortschr Kieferothop; Jun. 1991, vol. 52(3); pp. 117-125.
Wong et al., "Computer-aided design/computer-aided manufacturing surgical guidance for placement of dental implants": Case report; Implant Dentistry; Sep. 2007, vol. 16(2); pp. 123-130.
Yaltara Software; Visual planner; 1 page; retrieved from the internet(http://yaltara.com/vp/) on Jun. 6, 2008.
Yamada et al.; Simulation of fan-beam type optical computed-tomography imaging of strongly scattering and weakly absorbing media; Applied Optics; 32(25); pp. 4808-4814; Sep. 1, 1993.
Zhang et al., "Visual Speech Features Extraction for Improved Speech Recognition", 2002 IEEE International conference on Acoustics, Speech and Signal Processing, May 13-17, 2002, vol. 2, 4 pages.
AADR. American Association for Dental Research; Summary of Activities; Los Angeles, CA: p. 195; Mar. 20-23,(year of pub. sufficiently earlier than effective US filing date and any foreign priority date) 1980.
Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology: Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product

(56) References Cited

OTHER PUBLICATIONS information for doctors); retrieved from the internet (http://omico.cem/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment; (Patient Information); retrieved from the internet (http://ormco.com/aoa/appliancesservices/RWB/patients.html); 2 pages on May 19, 2003.
Allesee Orthodontic Appliances: The Red, White & Blue Way to Improve Your Smile: (information for patients), 2 pages; (year of pub. sufficiently earlier than effective US filing date and any foreign priority date) 1992.
Allesee Orthodontic Appliances; Yon may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58. Special Issue A, p. 221; Jan. 1979.
Altschuler et al.; Laser Electro-Optic System for Rapid Three-Dimensional (3D) Topographic Mapping of Surfaces; Optical Engineering: 20(6); pp. 953-961; Dec. 1981.
Altschuler el al.: Measuring Surfaces Space-Coded by a Laser-Projected Dot Matrix; SPIE Imaging q Applications for Automated Industrial Inspection and Assembly: vol. 182; pp. 187-131; Oct. 10, 1978.
Altschuler; 3D Mapping of Maxillo-Facial Prosthesis; AADR Abstract #607; 2 pages total, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System forthe Detection of Prosthesis Loosening in Total Hip Arthroptasty: NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems: University of Illinois; pp. 142-166; Aug. 26-30, 1975.
Baumrind; Integrated Three-Dimensional Craniofacial Mapping; Background, Principles, and Perspectives; Seminars in Orthodontics; 7(4); pp. 223-232; Dec. 2001.
beautyworlds.com; Virtual plastic surgery—besutysurge.com announces launch of cosmetic surgery digital imaging services; 5 pages; retrieved from the internet (http://www.beautyworlds.com/cosmossurgdigitalimagning.htm); Mar. 2004.
Begole et al.; A Computer System for the Analysis of Dental Casts; The Angle Orthodontist; 51(3); pp. 252-258; Jul. 1981.

Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253: Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I): pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized: IEEE Transactions on Image Processing; 13(5); pp. 710-719; May 2004.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on the Uses of the Computer in Orthodontic Practice (Part 1); Journal of Clinical Orthodontics; 13(7); pp. 442-453; (interview): Jul. 1979.
Burstone; Dr. Charles J. Burstone on the Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Cottingham; Gnathologic Clear Plastic Positioner; .American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With a Vision, Part 3: The Computer Gives New Vision—Literally, Part 4: Bytes 'N Bites the Computer Moves From The Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
CSI Computerized Scanning and imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.

(56) References Cited

OTHER PUBLICATIONS

Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific: Seminars in Orthodontics; 7(4); pp. 258-265: Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysts of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
DENT-X; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doyle; Digital Dentistry; Computer Graphics World; pp. 50-52 andp. 54; Oct. 2000.
Duret et al.; CAD/CAM Imaging in Dentistry; Current Opinion in Dentistry; 1(2); pp. 150-154; Apr. 1991.
Duret et al; CAD-CAM in Dentistry; Journal of the American Dental Association; 117(6); pp. 715-720; Nov. 1988.
Duret; The Dentai CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofaciai Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Futterling et al.; Automated Finite Element Modeling of a Human Mandible with Dental Implants; JS WSCG '98—Conference Program; 8 pages; retrieved from the internet (https://dspace5.zcu.cz/bitstream/11025/15851/1/Strasser_98.pdf); on Aug. 21, 2018.
Gansky; Dental data mining: potential pitfalls and practical issues; Advances in Dental Research; 17(1); pp. 109-114; Dec. 2003.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date): 2002.
Gottleib et al.; JCO Interviews Dr. James A. McNamura, Jr., on the Frankel Appliance: Part 2: Clinical 1-1 Management, Journal of Clinical Orthodontics: 16(6); pp. 390-467, retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized racial Imaging in Oral and Maxillofacial Surgery; American Association of Oral and Maxillofacial Surgeons; 48(8) suppl 1; pp. 5-6; Sep. 13, 1990.
Guess et al.; Computer Treatment Estimates in Orthodontics and Orthognathic Surgery; Journal of Clinical Orthodontics; 23(4); pp. 262-268: 11 pages; (Author Manuscript): Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom//toolingampproduction/november011996/simulatingstressputonfa,, ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold: The Problem, Electronic Data Transmission and the Law; American Journal of Orthodontics and Dentofacial Orthopedics; 113(4); pp. 478-479: 5 pages; (Author Manuscript); Apr. 1998.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.

(56) References Cited

OTHER PUBLICATIONS

Kesling et al.; The Philosophy of the Tooth Positioning Appliance; American Journal of Orthodontics and Oral surgery; 31(6); pp. 297-304; Jun. 1945.

Kesling; Coordinating the Predetermined Pattern and Tooth Positioner with Conventional Treatment; American Journal of Orthodontics and Oral Surgery; 32(5); pp. 285-293; May 1946.

Kim et al.; Non-invasive mouthguard biosensor for continuous salivary monitoring of metabolites; Analyst; 139(7); pp. 1632-1636; Apr. 7, 2014.

Kleeman et al.; The Speed Positioner; J. Clin. Orthod.; 30(12); pp. 673-680; Dec. 1996.

Kochanek: Interpolating Splines with Local Tension, Continuity and Bias Control; Computer Graphics; 18(3); pp. 33-41; Jan. 1, 1984.

Kumar et al.; Biomarkers in orthodontic tooth movement; Journal of Pharmacy Bioallied Sciences; 7(Suppl 2); pp. S325-S330; 12 pages; (Author Manuscript); Aug. 2015.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics: Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments as Easy as One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority dale); 1985.

Nahoum, The Vacuum Formed Dental Contour Appliance: N. Y. State Dent. J.; 30(9); pp. 385-390; Nov. 1964.

Nash; Cerec CAD/CAM Inlays: Aesthetics and Durability in a Single Appointment; Dentistry Today: 9(8); pp. 20, 22-23 and 54; Oct. 1990.

Nishiyama et al.; A New Construction of Tooth Repositioner by LTV Vinyl Silicone Rubber; The Journal of Nihon University School of Dentistry: 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3): pp. 219-228; Mar. 2004.

Ogimoto et al.; Pressure-pain threshold determination in the oral mucosa; Journal of Oral Rehabilitation; 29(7); pp. 620-626; Jul. 2002.

Page et al.; Validity and accuracy of a risk calculator in predicting periodontal disease; Journal of the American Dental Association; 13 3(5); pp. 569-576; May 2002.

Paul et al.; Digital Documentation of Individual Human Jaw and Tooth Forms for Applications in Orthodontics; Oral Surgery and Forensic Medicine Proc. of the 24th Annual Conf. of the IEEE industrial Electronics Society (IECON '98); vol. 4; pp. 2415-2418; Sep. 4, 1998.

Pinkham; Foolish Concept Propels Technology; Dentist, 3 pages , Jan./Feb. 1989.

Pinkham; Inventor's CAD/CAM May Transform Dentistry; Dentist; pp. 1 and 35, Sep. 1990.

Ponitz; Invisible retainers; Am. J. Orthod.; 59(3); pp. 266-272; Mar. 1971.

Procera Research Projects: Procera Research Projects 1993 ' Abstract Collection; 23 pages; (year of pub. sufficiently earlier than effective US filing date and any foreign priority date) 1993.

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.

Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.

Redmond et al.; Clinical Implications of Digital Orthodontics; American Journal of Orthodontics and Dentofaciai Orthopedics; 117(2); pp. 240-242; Feb. 2000.

Rekow et al.; CAD/CAM for Dentai Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rekow; A Review of the Developments in Dental CAD/CAM Systems; Current Opinion in Dentistry; 2; pp. 25-33; Jun. 1992.

Rekow; CAD/CAM in Dentistry: A Historical Perspective and View of the Future; Journal Canadian Dental Association; 58(4); pp. 283, 287-288; Apr. 1992.

Rekow; Computer-Aided Design and Manufacturing In Dentistry: A Review of the State of the Art; Journal of Prosthetic Dentistry; 58(4); pp. 512-516; Dec. 1987.

Rekow; Dental CAD-CAM Systems: What is the State of the Art?; The Journal of the American Dental Association; 122(12); pp. 43-48; Dec. 1991.

Rekow; Feasibility of an Automated System for Production of Dental Restorations, Ph.D. Thesis; Univ. of Minnesota, 250 pages, Nov. 1988.

Richmond et al.; The Development of the PAR Index (Peer Assessment Rating); Reliability and Validity.; The European Journal of Orthodontics, 14(2), pp. 125-139; Apr. 1992.

Richmond et al.; The Development of a 3D Cast Analysis System; British Journal of Orthodontics; 13(1); pp. 53-54; Jan. 1986.

Richmond; Recording the Dental Cast in Three Dimensions; American Journal of Orthodontics and Dentofacial Orthopedics; 92(3); pp. 199-206; Sep. 1987.

Rudge; Dental Arch Analysis: Arch Form, A Review of the Literature; The European Journal of Orthodontics; 3(4); pp. 279-284; Jan. 1981.

Sakuda et al.; Integrated Information-Processing System in Clinical Orthodontics: An Approach with Use of a Computer Network System; American Journal of Orthodontics and Dentofacial Orthopedics; 101(3); pp. 210-220; 20 pages; (Author Manuscript) Mar. 1902.

Schellhas et al.; Three-Dimensional Computed Tomography in Maxillofacial Surgical Planning; Archives of Otolaryngology—Head and Neck Surgery; 114(4); pp. 438-442; Apr. 1988.

(56) References Cited

OTHER PUBLICATIONS

Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; Cerec—Computer-Reconstruction, High Tech in der Zahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, CEREC 3D, Manuel utillsateur, Version 2.0X (in French); 114 pages; (English translation of table of contents included); (year of pub. sufficiently earlier than effective US filing date and any foreign priority date); 2003.
Stoll et al.; Computer-aided Technologies in Dentistry; Dtsch Zahna'rztl Z 45, pp. 314-322; (English Abstract included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
The American Heritage, Stedman's Medical Dictionary; Gingiva; 3 pages: retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-28; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models'An Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23 (10); pp. 694-700; Oct. 1989.
Watson et al.; Pressures recorded at te denture base-mucosal surface interface irs complete denture wearers; Journal of Oral Rehabilitation 14(8); pp. 575-589; Nov. 1987.
Wells; Application of the Positioner Appliance in Orthodontic Treatment; American Journal of Orthodontics; 58(4); pp. 351-366; Oct. 1970.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamamoto et al.; Optical Measurement of Dental Cast Profile and Application to Analysis of Three-Dimensional Tooth Movement in Orthodontics; Front. Med Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhou et al.; Biofuel cells for self-powered electrochemical biosensing and logic biosensing: A review; Electroanalysis; 24(2); pp. 197-209; Feb. 2012.

(56) References Cited

OTHER PUBLICATIONS

Zhou et al.; Bio-logic analysis of injury biomarker patterns in human serum samples; Talanta; 83(3); pp. 955-959; Jan. 15, 2011.

* cited by examiner

ARCH ADJUSTMENT APPLIANCE

CROSS REFERENCE TO RELATED APPLICATIONS

This application is a divisional of U.S. patent application Ser. No. 14/850,305, filed Sep. 10, 2015, now U.S. Pat. No. 10,449,016, which claims priority from U.S. Provisional Patent Application No. 62/052,893, filed Sep. 19, 2014, each of which is incorporated herein by reference in its entirety for all purposes.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The present disclosure is related generally to the field of dental treatment. More particularly, the present disclosure is related to methods, systems, and devices for adjusting an arch of a patient.

Dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement.

Such systems typically utilize materials that are lightweight and/or transparent to provide a set of appliances that can be used serially such that as the teeth move, a new appliance can be implemented to further move the teeth toward the desired goal.

In some instances, the width of a dental arch of a patient's upper dentition and/or and a width of a dental arch of a patient's lower dentition can be insufficient (e.g., too narrow) and on rare occasions, the width may be excessive (e.g., Brodie bite). A dental arch that is insufficient can result in malocclusions such as crossbite, crowding of teeth, impacted teeth, and/or the patient's smile may not be aesthetically pleasing in appearance. For instance, a patient's smile may be "narrow", resulting in a sunken appearance in the buccal corridors due to the inability to see the back teeth from the front view.

In certain types of front-to-back bite correction (e.g., Class II and Class III correction), a need for transverse width correction exists, without which the upper and lower arches will not be properly coordinated. For Class II correction, the upper needs to be expanded so that when the lower is advanced, the teeth in the buccal regions (typically the bicuspids and molars) are fitting together correctly in the buccal-lingual dimension. For Class III correction, the reverse is required, and the lower needs to be expanded since it is usually the one that has compensated for the Class III bite by constricting. When both Class II and Class III are corrected to a more ideal Class I bite, the respective compensations need to be undone, and a transverse width dimension of movement is necessary in addition to the anterior-to-posterior movement.

There are several ways in which the arch of a patient can be expanded. For example, palatal expansion expands the upper jaw of the patient by spreading the maxilla. In some situations, the teeth of the upper and/or lower jaw can be moved or angled outward thereby expanding the width of the arch of the patient. This technique can be referred to as dental expansion. Further, expansion of the lower arch in this manner is often referred to as mandibular expansion.

In young patients, the midpalatal suture has not fused the left and right maxillary palates together and therefore, the movement of the plates with respect to each other can be accomplished more easily and with less force than in older patients. When the fusing of the suture is new, it may still be possible to split the suture apart.

For example, currently available orthodontic appliances can include a jackscrew and/or other mechanism that is employed to deliver a horizontal stretching force to the molar teeth to split the upper jaw of the patient along the midpalatal suture. Such a mechanism typically spreads the left and right maxillary plates of the palate apart and then new bone material grows in between to fill the gap. As such, a large horizontal force (e.g., 10 to 50 Newtons (N) with cumulative loads reaching 40 to 150 N across the suture) is applied during a short period, in many cases. The insertion of such a mechanism is typically accomplished by a treatment professional and can cause discomfort and/or pain for a patient.

In some instances, the screw and/or other mechanism can be employed incrementally one or more times a day (e.g., 0.25 mm expansion twice a day—one activation in the morning and once at night). For example, a pinhole can be present in the orthodontic appliance and a patient can insert an activation key into the pinhole to incrementally increase a distance between portions of the orthodontic appliance.

Such orthodontic appliances can be difficult for a patient to use, and often require assistance from another person (e.g., a parent) to turn the key. Not only are such appliances often not aesthetically pleasing, they often times interfere with the patient's speech, temporarily affect their ability to chew and/or swallow, and/or can be painful when activated.

Adding to the challenges of such an appliance is the need to retain the expansion while the bone is filling into the suture, long after the active expansion has taken place. The active expansion process may be completed within 2 or 3 weeks' time, but the retention period can last around 6 months while waiting for the gap between the maxillary halves to fill in with new bony tissue.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
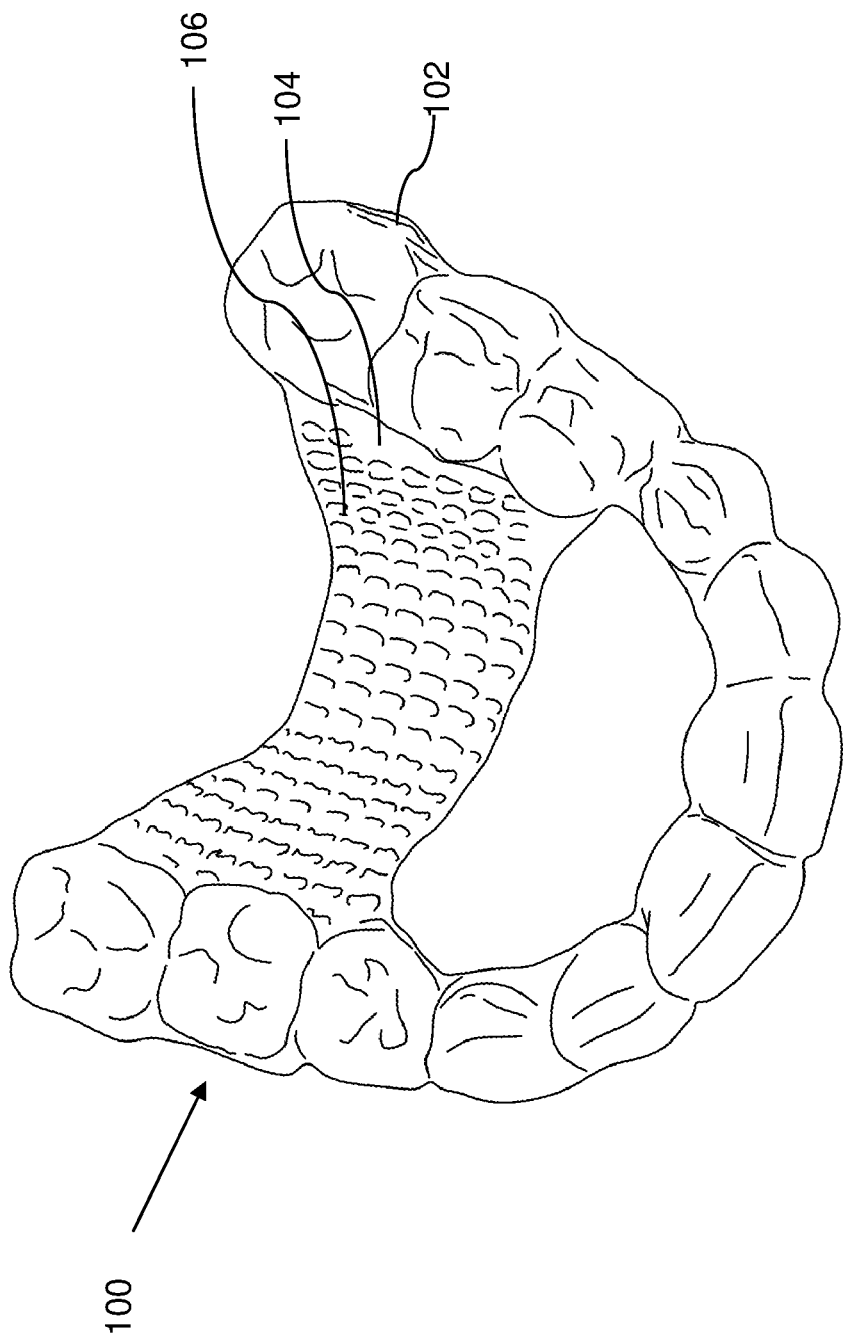
FIG. 1A illustrates an example of an appliance having a structural reinforcement feature provided thereon according to a number of embodiments of the present disclosure.

As discussed above, the present disclosure provides methods, systems, and devices for expanding an arch of a patient. Generally, dental and/or skeletal expansion occurs during an orthodontic treatment which is a process of moving and reorienting teeth for functional and/or aesthetic purposes, although repositioning may be made for other purposes.

In some instances, an arch of a patient's teeth can be insufficient (e.g., narrow), and in rare occasions, too wide. An insufficient arch of a patient's teeth can cause overcrowding of a patient's teeth, impacted teeth, speech difficulty, breathing issues, and/or the smile of a patient can be aesthetically unpleasing. As such, an orthodontic treatment plan can include an arch expansion component and such a process typically occurs in an early stage of the plan in order to provide more room for the teeth to be arranged.

A narrow arch also prevents the anterior-posterior bite relationship from being corrected properly. An arch of teeth, as used herein, can include a curved row of teeth on a particular jaw of a patient. An insufficient arch can include an arch that has a width too narrow to support the row of teeth in a correct alignment, for instance. The arch width of a patient's teeth can be expanded, for instance, using an orthodontic appliance (e.g., a dental appliance).

As discussed above, patients that are children or teenagers may have a maxilla where the midpalatal suture has not yet fused. Usually in the mid to late teens, the palatal suture fuses and the halves of the maxilla join together to become a single maxillary bone.

The maxilla (e.g., the upper jaw) is a bone that is fixed to the skull and forms the palate of the patient. The mandible (e.g., lower jaw) is a bone that is also attached to the skull by numerous muscles which power its movement. The mandible articulates at its posterior upward extremities with the temporal bone to form the jaw joint. The jaw joint is a loosely connected joint that accommodates the variety of movements of the mandible relative to the maxilla during biting and chewing.

In correctly shaped and positioned jaws, the upper teeth occupy an arch that is wider than the arch comprising the lower teeth. In other words, the upper teeth are designed to be buccally positioned relative to the teeth in the lower jaw. Malocclusions, such as crossbite, occur when this normal arrangement is reversed and one or more of the upper teeth are positioned lingual to the teeth in the lower jaw.

A patient with an un-fused maxilla can, for instance, have their palate skeletally expanded. This is in contrast to dental expansion where the teeth are uprighted or moved within the boundaries of the jaw in which they are contained. With skeletal expansion, the underlying bone is moved and the teeth are moved along with the changes to the shape of the bone.

Expanding a palate can, for instance, include splitting the left and right sides of the maxilla so that the teeth on the upper left side move as a single unit relative to the teeth on the right side. Because of this phenomenon, a gap between the top two front teeth can open up during the expansion process if they are not restrained from separating.

As discussed above, expansion of the palate, such as those methods performed prior to an orthodontic treatment involving braces and wires, currently includes having a treatment professional place an orthodontic appliance that may include anchoring bands, support bars, springs, and/or jack screws. The appliance is firmly affixed to the teeth at the anchor points and the springs or jackscrew applies forces on the teeth in order to move the underlying portions of the palate of the patient, thereby causing the arch of the patient's dentition to widen.

To adjust the appliance and increase the amount of expansion, the patient and/or another person must insert a key into the pinhole and turn the key to increase the width of the orthodontic appliances. In some examples, prior approaches can include a removable appliance which contains a jackscrew expander that is activated with a pinhole key.

After expanding the arch of the patient to the desired width (and sometimes overcorrecting in order to anticipate potential relapse toward the narrowness initially present), further orthodontic treatment can be performed to move and re-orient the teeth of the patient. This type of additional orthodontic treatment is typically performed after the expansion phase and a retention period where the jaw position is stabilized for a period of time while the musculature and bone adjust to the new positioning.

Further, palate expansion devices that are used primarily for skeletal expansion are typically temporarily anchored to the molars and/or pre-molars of the patient for the duration of the expansion and cannot be removed except by a dental professional because they are cemented into place. The forces that are applied to the molars and/or premolars are rather high in order to separate the suture during a short time period (e.g., one or more days), and therefore, the treatment can be uncomfortable to the patient due to the high pressure that is generated during the activation period. Once the suture splits, the majority of the pressure is relieved and subsequent activations in close proximity to the initial activation are not as uncomfortable.

In contrast, expanding an arch of a patient (whether skeletally with a fixed appliance or dentally with a removable appliance) according to embodiments of the present disclosure, can include utilizing a set of one or more appliances, such as positioners, retainers, and/or other removable appliances (e.g., clear plastic polymer shells and/or aligners) having a shell to be worn over the teeth of a patient and having an arch element thereon that is designed to expand an arch of teeth of the patient by: moving the teeth of the patient to a wider position within the jaw, by expanding the palate of the patient, or a combination of the two. As indicated, some embodiments discussed herein may also expand the palate to a degree, but the dental expansion is much more gradual (e.g., on the order of 0.5 mm per month as opposed to 0.5 mm per day).

Palatal expansion may be accomplished, for example, in patients where the midpalatal suture has not fused. Additionally, some embodiments may be able to un-fuse the suture, in some patients.

One or more appliance embodiments can include a removable shell formed of a first material having a number of cavities therein, wherein the cavities are shaped to receive teeth of the patient. These appliances are not fixed to the teeth of the patient and therefore can be removed by the patient for periods of time during treatment without aid from other people or intervention by a treatment professional.

Figure 7:
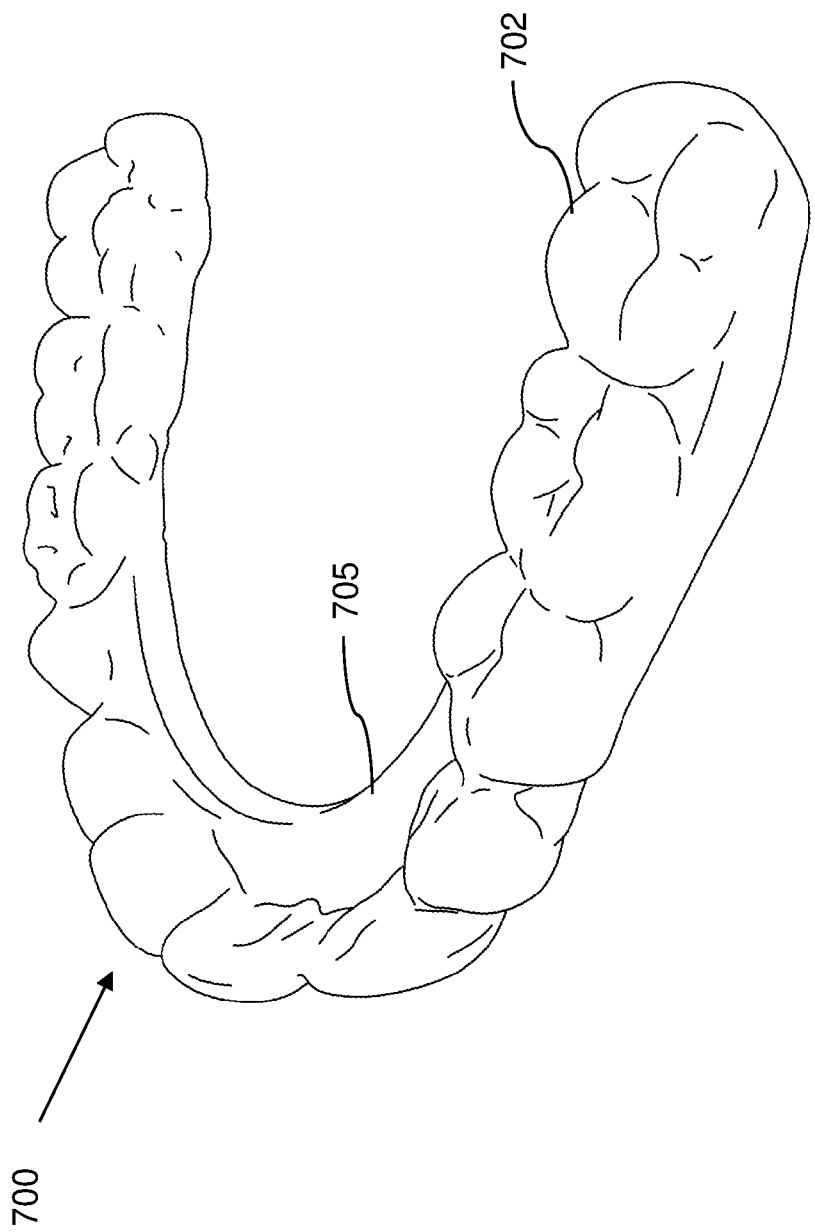
FIG. 7 illustrates an example of an appliance having an anterior tab arch element according to a number of embodiments of the present disclosure.
Figure 9:
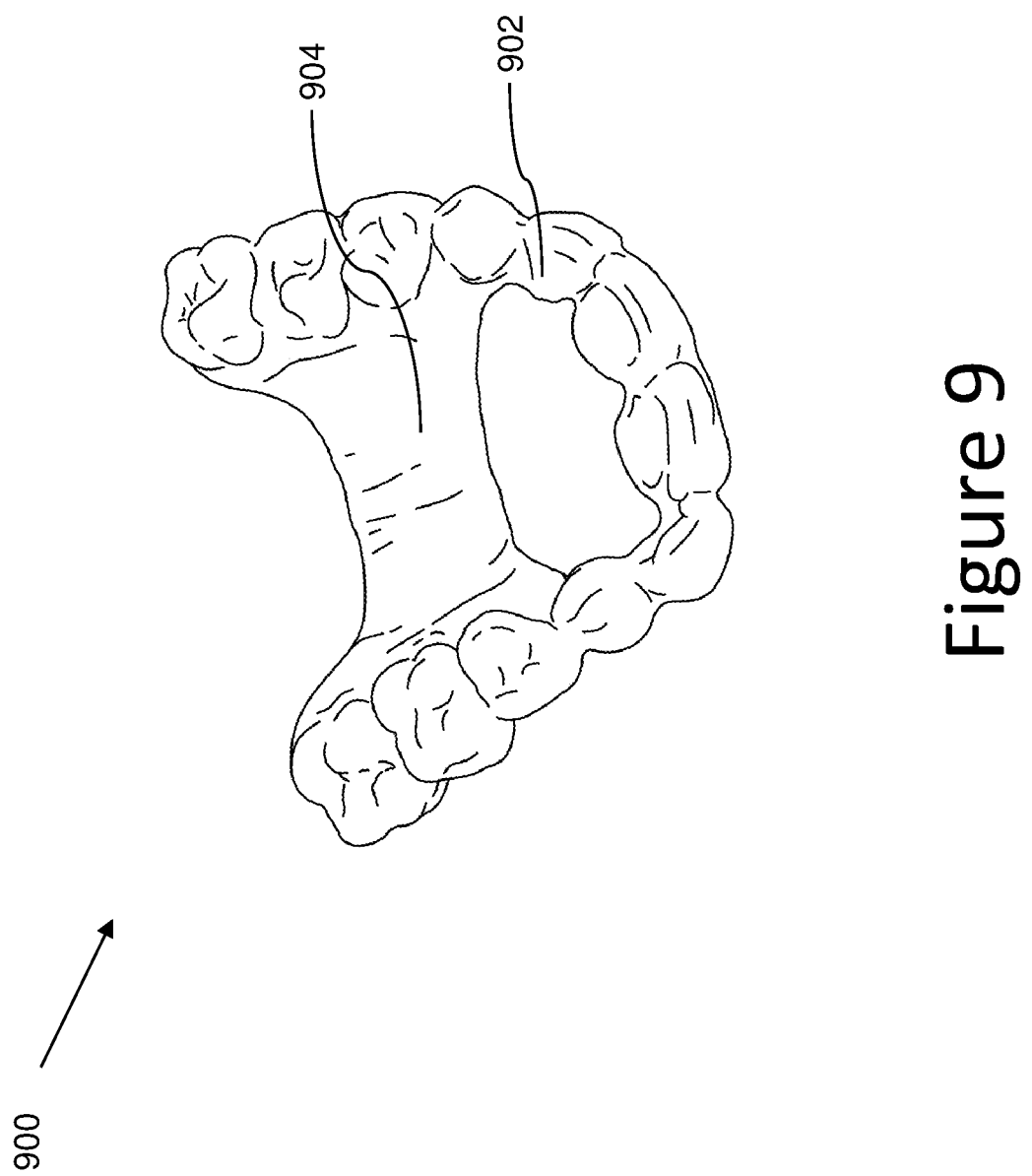
FIG. 9 illustrates an example of an appliance having an arch element connecting the posterior sides of the arch according to a number of embodiments of the present disclosure.
Figure 10:
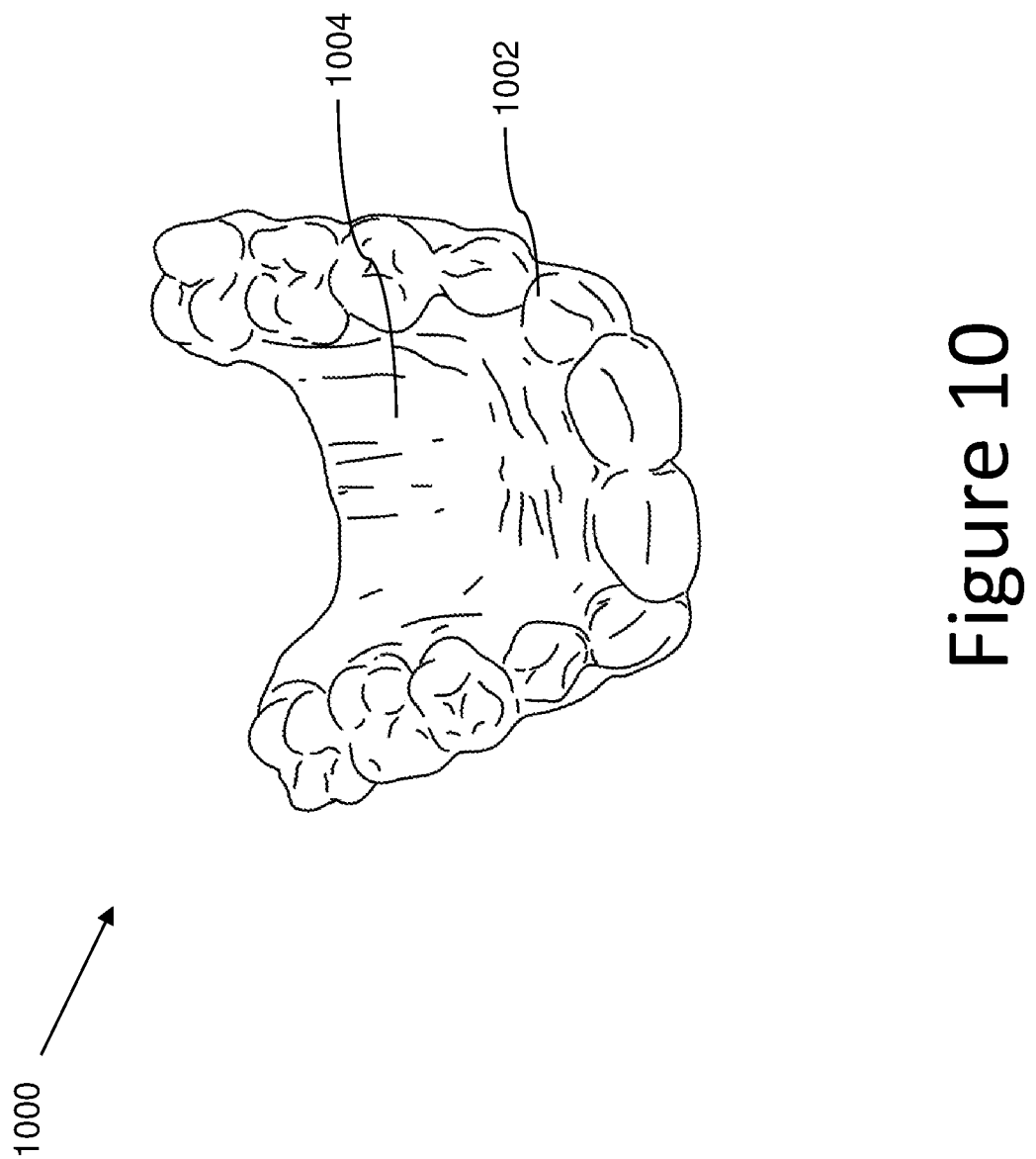
FIG. 10 illustrates an example of an appliance having a full palatal arch element according to a number of embodiments of the present disclosure.
Figure 11:
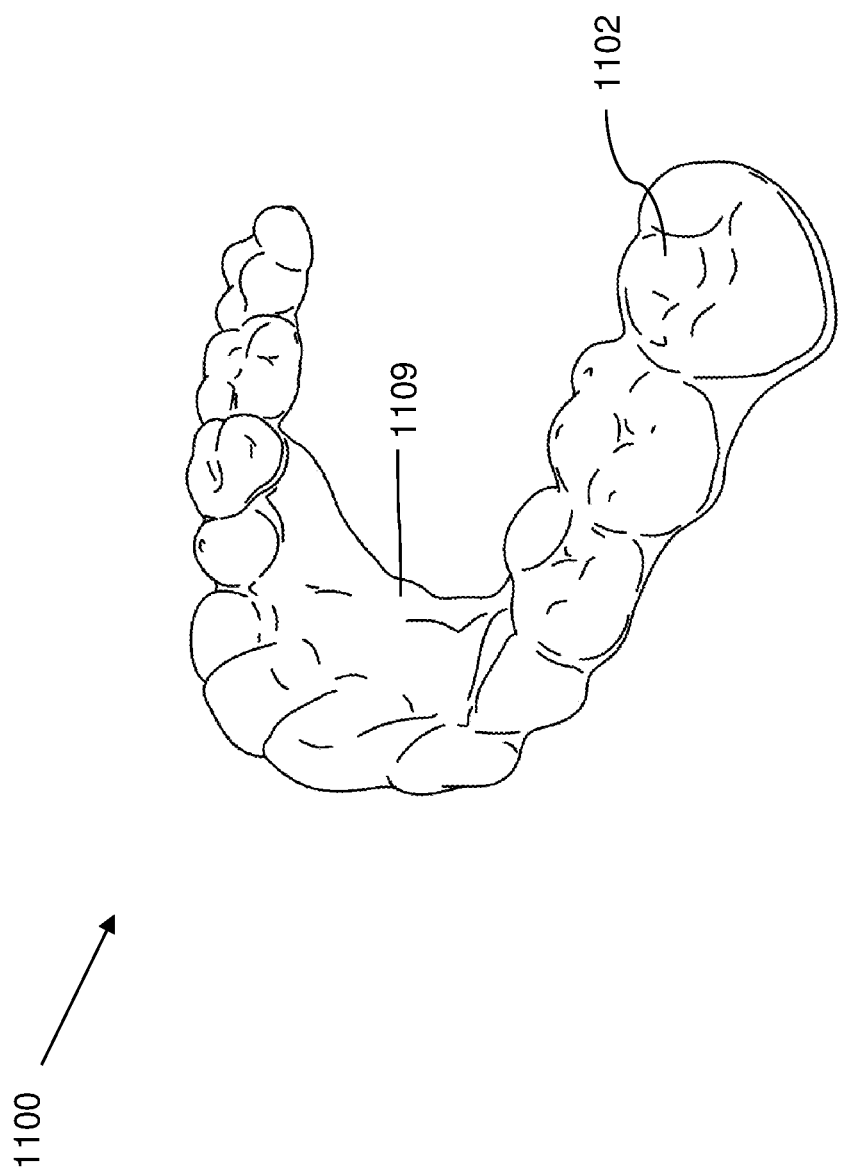
FIG. 11 illustrates an example of an appliance having an extended gingival feature thereon according to a number of embodiments of the present disclosure.

In various embodiments of the present disclosure, an arch element (e.g., a trans-palatal arch element as illustrated in the embodiments of FIGS. 9 and 10 or a mandibular arch element as illustrated in the embodiments of FIGS. 7 and 11) can extend from the removable shell and across at least a portion of the arch width of the removable shell. The arch width can be from molar to molar, from premolar to premolar, from canine to canine, or from any tooth on the left side to any tooth on the right side.

In mandibular arch elements, the arch can extend along the inside of the teeth in the anterior area of the patient's mouth, as shown in FIGS. 7 and 11. In palatal arch elements, the arch element can extend across the palate (trans-palatal) and can extend across at the posterior, anterior, in parts of one or the other, or in both areas of the patient's mouth.

In some embodiments, the arch element can be formed of a first material and from a second material that is a different than the first material in at least one physical property. For example, the first material may be a polyurethane material and the second material also be a polyurethane material with the same chemical formula, but of different hardness or rigidity due to greater crosslinking. Or, the first material can be of one chemical composition (e.g. polyurethane), and the second material of an entirely different chemical composition (e.g. polyvinyl chloride).

In some embodiments, the second material is more resilient than the first material. This can be beneficial in embodiments, for example, where there is an initial need for a more rigid arch element and then a more resilient arch element later in treatment, among other situations where such an embodiment may be utilized.

The arch element can have a width specific to a stage of a treatment plan and can be designed to expand an arch of the teeth of the patient to that specified width, which may be less than the full width in which that arch is to be expanded (i.e., the arch expansion can be incrementally accomplished by expanding the arch a little at a time over the use of several differently designed sequential dental appliances). Or the arch may be over-expanded to compensate for incomplete biological response to the desired outcome, where the actual width of the teeth is less than the width programmed or built into the stage(s) of the treatment plan which can provide a constant transverse expansion force to achieve slow palatal expansion.

For example, rather than providing a strong force, such as 10 to 50 N for a short period of a few days to a few weeks, embodiments of the present disclosure can provide a lesser force, such as 3 to 9 N, for a longer period, such as a month to six months. This force can be used, for example, to move palatal plates, move teeth outward, and/or maintain the teeth and/or jaw in a particular orientation while musculature and bone are adjusting to the orientation and to prevent movement of the teeth or jaw back toward their initial orientation.

In some embodiments, the second material can include, for instance, a more rigid material than the first material designed to provide greater resistance and/or force in a horizontal direction (i.e., transverse direction) against the posterior teeth (e.g., molars and bicuspids) of the arch of the patient. In various embodiments, this second material can be designed to impart force to the molars and/or other teeth on the jaw of the patient in order to either help preserve or change the transverse dimensions of the arch. Additionally, in some embodiments, with the use of appliances on the upper and lower jaws, the force can be imparted to parts of the opposing jaw (e.g., teeth, jaw bone, etc.).

The expansion of an arch of teeth in the patient can be used to treat malocclusions such as crossbites, sagittal problems, crowding, and/or to help prevent or resolve impacted teeth, in various embodiments. The transverse support elements can be designed to not interfere with the shells of the dental appliance. In this manner, a dental appliance in accordance with embodiments of the present disclosure can be used to concurrently expand or constrict an arch of the patient while repositioning a number of teeth of the patient.

For example, in some embodiments, the shell of the dental appliance can be used to provide force on one or more teeth to change their location or orientation. Embodiments of the present disclosure can be utilized to treat Class I, Class II, and Class II malocclusions.

For instance, with Class I malocclusions, teeth of the patient are inserted into cavities in the shell and the shell applies force to one or more teeth to change their location or orientations. With Class II (overbite or overjet) and Class III (underbite) malocclusions, the appliance can include other features, such as cut outs (areas cut out of the appliance shell material to allow access to the tooth surface through the appliance or to form, for example, a hook to attach a resilient member (e.g., an elastic band material) between the upper and lower jaw, to for instance treat a overbite or overjet.

As discussed above, in some embodiments, a plurality of appliances can be worn by a patient successively to achieve gradual expansion (or constriction) of the arch of teeth in the patient. For instance, each of a plurality of dental appliances can include an incrementally wider width to expand the arch of the patient in incremental distances. In some such embodiments, since this arch expansion technique can be accomplished concurrently with other orthodontic treatments, the arch expansion can be accomplished over a series of appliances that will be utilized, for example, over a period of less than six months, thereby making any pain and/or discomfort of the patient more consistent and less arbitrary without prolonging the overall time for orthodontic treatment.

In some embodiments, an appliance can be formed using a thermoforming process. For instance, a first portion of an arch element can be formed of a material using a virtual model of the palate of the patient and a virtual model of a number of teeth of the patient.

The first portion of the arch element can be wider than the arch width of the number of teeth of the first jaw of the patient and can be shaped to substantially follow contours of the palate of the patient. For expansion, this difference in the width will facilitate the movement of the arch outward toward the wider position of the arch element generating a transverse expansion force.

A removable shell can be formed over a set of molded teeth. The removable shell can include a number of cavities formed therein and shaped to receive the number of teeth of patient and a second portion of the arch element. The second portion of the arch element can be formed of the same material as the removable shell and can include the same width as the first portion of the arch element.

The first portion of the arch element and the second portion of the arch element can, for example, be connected to form the dental appliance. The first portion and second portion can be connected, in accordance with various embodiments of the present disclosure, for example, by thermoforming the removable shell over the set of molded teeth with the first portion of the arch element placed within the set of molded teeth (e.g., encapsulated), or via direct fabrication of the arch elements from a virtual model, then by fusing the two materials together (e.g., ultrasonic welding), by adhering the first portion and the second portion using an agent subsequent to forming the first portion and the removable shell, and/or by adding a number of features to the first portion of the arch element (e.g., as discussed further herein).

In this manner, a dental appliance can be formed that has two distinct material properties, but is unitary in nature (e.g., forms a single body that can be used by the patient even though it is formed of two materials). Such embodiments, are discussed with regard to the embodiments illustrated in the figures and discussed below.

In the detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1A, and a similar element may be referenced as 304 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1A illustrates an example of an appliance according to a number of embodiments of the present disclosure. The appliance 100, illustrated in the embodiment of FIG. 1A, can include an upper dentition appliance (e.g., an appliance placed on the upper jaw of the patient). An upper jaw can include a maxilla and can include a number of teeth of a patient's upper dentition. The lower jaw can include a mandible and can include a number of teeth of the patent's lower dentition.

Appliances can include any positioners, retainers, and/or other removable dental appliances for finishing and maintaining teeth positioning in connection with a dental treatment. These appliances may be utilized by the treatment professional in performing a treatment plan. For example, a treatment plan can include the use of a set of appliances, created according to models described herein. Appliances, in some embodiments, can include flexible dental appliances which serve, in part, as a prosthesis for esthetics and/or dental function.

An appliance can, for example, be fabricated from a polymeric shell, and/or formed from other material, having a cavity shaped to receive and apply force to reposition one or more teeth from one teeth arrangement to a successive teeth arrangement. The shell may be designed to fit over a number of, or in many instances all, teeth present in the upper and/or lower jaw. The shell can include an interior surface (e.g., adjacent to a surface of the teeth place therein) and an exterior surface. The interior surface is configured to receive and a apply forces to the teeth therein to reposition a number of teeth of the patient, for example.

In accordance with some embodiments of the present disclosure, the appliance 100 can include a removable shell 102 formed of a first material having a number of cavities formed therein. As discussed above, the number of cavities can be shaped to receive teeth of the patient.

The appliance 100 can include an arch element 104 extending from the removable shell 102 in a lingual direction and across an arch width of the removable shell 102. The arch width of the removable shell 102, as used herein, is a space between the cavities of the removable shell 102. For instance, the arch element 104 can expand across a surface of the mouth of the patient when the dental appliance 100 is placed over the teeth of the patient. The surface of the mouth can include, for instance, a palate and/or floor of the mouth.

The arch element, as illustrated by FIG. 1A, can be formed of the first material and a structural reinforcement feature thereon. As defined herein, a structural reinforcement feature can be any structure that increases the rigidity of a portion of the appliance or increases one or more force vectors (force provided in X, Y, and/or Z axial directions). In one example, with respect to the embodiment of FIG. 1A, the arch element 104 includes areas that are corrugated 106.

As discussed above, the arch element can be designed to expand an arch of teeth of the patient. For instance, the width of the arch element can be wider than the actual arch width of the teeth of the patient in order to define the desired arch width incremental target for the teeth. An arch width of the teeth of the patient can include a distance between teeth of the left posterior side of the patient's dentition and teeth of the right posterior side of the patient's dentition. As an example, the arch element can be 0.25 millimeters wider than the arch width of the teeth of the patient.

The element 104 as shown is designed to provide structural reinforcement to the posterior section but also allows flexibility in the anterior section, for example, if anterior transverse force is not desired. An advantage of this flexibility would be to ease the insertion force.

In some embodiments, the arch element, or a portion thereof, can be made from a second material that can be different in at least one material property (e.g., chemical property of a material, weight of material used, mixture of chemicals used, etc.) than the first material. For instance, the rigidity of the second material can apply a force to at least a portion of the number of teeth in a transverse direction (e.g., horizontal direction) to expand the arch of teeth of the patient.

Figure 5:
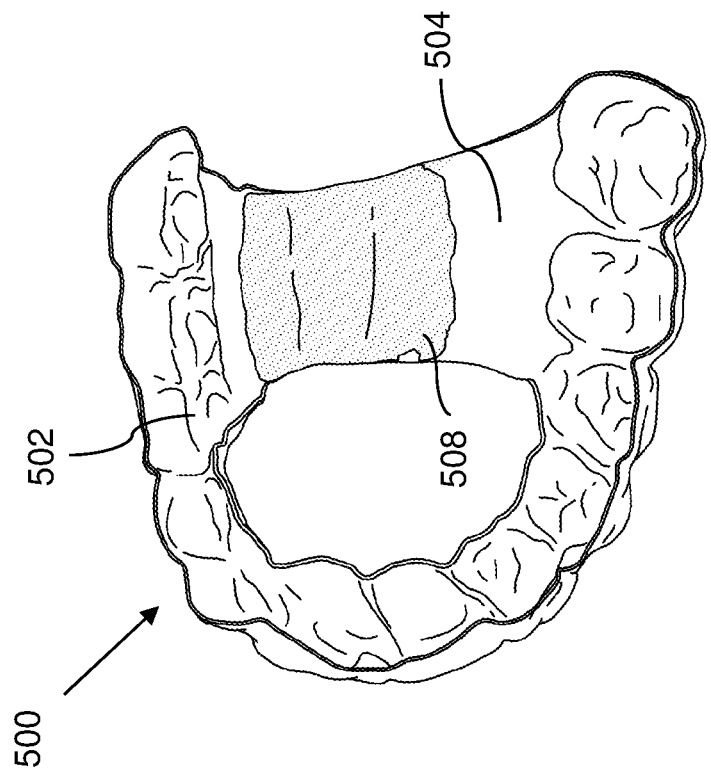
FIG. 5 illustrates an example of an appliance having a structural reinforcement material according to one or more embodiments of the present disclosure.
Figure 5:
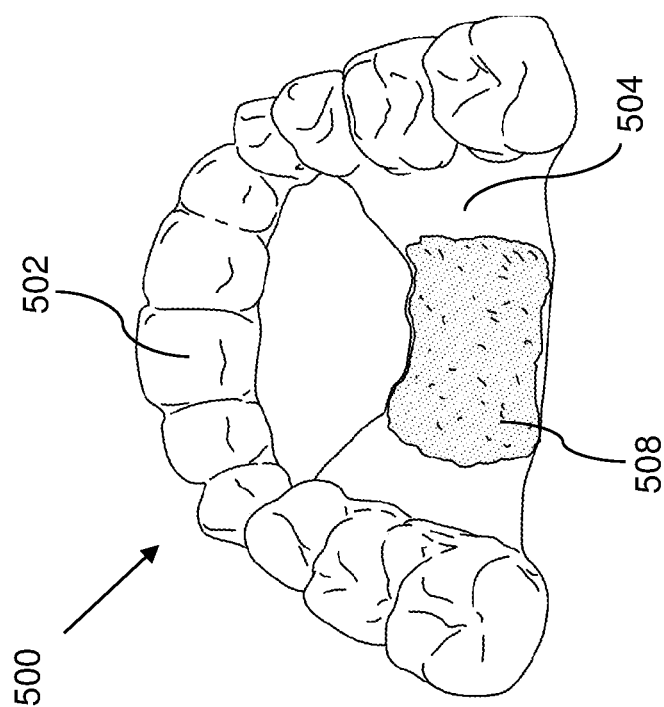

In some embodiments, the first material of the arch element can form a first layer and the second material of the arch element can form a second layer (e.g., as illustrated in the embodiment of FIG. 5). The first layer of the first material can be formed integrally with and of a same material as the removable shell 102, for instance. The second layer of the second material can be formed in a separate process and attached to the first layer of the first material, for example (e.g., as discussed further herein).

In some embodiments, the arch element can follow contours of a surface of the mouth of the patient when the appliance 100 is placed over the teeth of the patient. For example, the arch element can be shaped to substantially follow the contours of the palate of the patient. This can be accomplished, for example, by taking a mold or scan of the surface of the palate of the patient and then forming the surface of arch element to substantially match the mold/scan surface (i.e., the surface may not be identical, as the arch element may be designed to be wider as discussed above and therefore is not an identical copy of the mold/scan surface, and therefore may substantially match, but not be identical).

The contours of the palate in the appliance may be interpolated in anticipation of a stretching of the tissues during the expansion, in order to better accommodate the seating of the appliance in the patient's mouth. In other words, the shape of the appliance is designed to include an expected stretching of the patient's palatal or lower lingual tissues during dental expansion, and not just a movement of the teeth.

In some embodiments, one side of the arch element 104, can be adjacent to and/or in contact with a tongue of the patient. The other side of the arch element can, for example, be adjacent to and/or in contact with a surface of the patient's mouth (e.g., the palate and/or floor of the patient's mouth). Further, as discussed herein, in some embodiments, using the patient's mouth mold and/or scan data, the transpalatal arch may be designed to contact the palate (e.g., if more support is desired) or it may be designed not to have contact (e.g., for patient comfort).

The appliance 100 can be used for repositioning the number of teeth of the patient concurrently with expansion of the arch of teeth of the patient utilizing the arch element. The expansion of the arch of teeth can include movement of posterior teeth (e.g., molars) and/or other teeth of the arch of the patient in a transverse direction and/or stretching of the maxillary suture of the patient (e.g., separates the maxillary halves in the region of the suture), along with a stretching of the surrounding soft tissues (e.g., the palatal gingiva) during the expansion.

The simultaneous treatment of misalignment of a patient's dental arch (e.g., insufficient dental arch width) in conjunction with teeth alignment issues (e.g., rotation, tipping, etc.) can, for example, potentially eliminate a second phase of a two phase treatment protocol, make the second phase less complex or a little more comfortable for the patient, shorten treatment times when compared to current linear two-phase treatment protocols that first treat the misalignment of a patient's dental arch followed by treatment of misalignment of the patient's teeth. That is, the arch element can, in accordance with a number of embodiments, avoid and/or not interfere with engagement of the removable shell 102 with the teeth therein and thereby allow for correction of various tooth misalignment issues during the arch expansion process so that both arch expansion and alignment correction occurs in tandem rather than as separate phases.

Although the present embodiment of FIG. 1A illustrates an appliance for an upper dentition of a patient, embodiments are not so limited. Appliances, in accordance with some embodiments, can include an appliance for a lower dentition of a patient and/or an appliance for an upper dentition and a lower dentition.

In some such embodiments, the arch element extending from a surface of an appliance for a lower dentition can substantially follow the contours of a portion of the floor of the patient's mouth. While the lower arch (i.e., mandible) does not contain a suture that can be split as the upper arch does, the same principles of appliance design described herein may be applied even in the lower in order impart greater transverse stability and/or force through the lower arch appliance to more effectively deliver transverse forces to the lower dentition for dental expansion purposes.

In some such embodiments, since a generally horizontal span across the bottom of the patient's mouth may not be suitable for positioning of an arch element (e.g., because the tongue is in the way), an appliance of the present disclosure may include reinforced portions of the dental appliance that impart forces to help dentally expand the lower arch of the patient. For example, a portion of the arch element may be positioned in front of the tongue of the patient or in close proximity to the tongue in order to impart a horizontal force and the shell may be designed to transfer or redirect the resulting anterior force generated by the tongue towards the back portion of the jaw of the patient (e.g., closer to the molars).

In some embodiments, a first appliance can be placed over the upper dentition and a second appliance can be placed over the lower dentition of the patient. The first appliance and the second appliance can each have an arch element.

The arch element of the first appliance and the arch element of the second appliance can expand the dental arch of the upper dentition and the dental arch of the lower dentition, respectively, to the same degree. Or in the case of Class II or Class III correction where a disproportionate amount of expansion/constriction is needed, the amounts can be coordinated so that the expansion targeted is suitable for the desired amount of anterior-posterior bite change.

In some embodiments of the present disclosure, the appliance 100 can be a portion of a treatment plan. For instance, the treatment plan can include a series of appliances designed to incrementally implement a treatment plan. Each of the series of appliances can be a stage of the incremental treatment plan, for instance. The series can be used for treating misalignment of teeth of a patient and/or misalignment of one or more arches of teeth of the patient. In some such embodiments, one arch can be expanded while the other arch is not expanded or both arches can be expanded simultaneously. Or one arch can be expanded while the other one is constricted.

For instance, a first appliance, of a series of appliances designed to incrementally implement a treatment plan can comprise a first shell formed of a first material having a plurality of cavities therein designed to receive teeth of a first jaw. The first appliance can include a first arch element formed of a first layer of the first material and a second layer of the second material different than the first material.

The first arch element can extend from the first shell across an arch width of the first shell. For instance, the first arch element can have a first width specific to a first stage of the treatment plan and/or can be designed to expand an arch of the teeth of the patient.

A second appliance, of the series of appliances, can comprise a second shell having a plurality of cavities therein designed to receive teeth of the first jaw. The second appliance can include a second arch element. For example, the second arch element can have a second width specific to a second stage of the treatment plan.

The second width can be wider than the first width. For instance, the second width can include an incremental increase in width as compared to the first width. The successive incremental increase in the arch width of the appliances corresponds to the desired gradual increase in the actual physical arch of the patient.

In accordance with some embodiments of the present disclosure, the series of appliances can include a third appliance. The third appliance can include a third shell having a plurality of cavities therein designed to receive teeth of the second jaw (e.g., the lower jaw). For instance, the third appliance can include a third arch element designed to expand the arch of teeth of the patient. The third arch element can have a third width specific to the first stage of the treatment plan.

In such an embodiment, the first appliance and third appliance can be for a first stage of the treatment plan. For instance, a patient can place the first appliance over the teeth of the first jaw (e.g., upper jaw) and can place the third appliance over the teeth of the second jaw (e.g., lower jaw). The first arch element of the first appliance and the third arch element of the third appliance can be designed to expand the arch of teeth of the first jaw and the arch of teeth of the second jaw to a same degree (e.g., equal distance) based on the first width and the second width. Equal distance in expansion amount is desirable if the upper and lower arches are already in good coordination and no front-to-back change in the bite is desired or planned.

In various embodiments, the series of appliances can include a fourth appliance. The fourth appliance can include a fourth shell having a plurality of cavities therein designed to receive teeth of the first jaw. The fourth appliance may not include an arch element and/or can include a fourth arch element, for example.

Although the present embodiments illustrate two stages of a treatment plan, embodiments in accordance with the present disclosure are not so limited. Treatment plans can include a variety of number of stages, including more or less than two treatment stages. At least a portion of the stages can include treatment for gradual expansion of an arch of teeth of a patient. Alternatively and/or in addition, one or more of the stages may not include arch elements, in various embodiments.

In an example embodiment, a system can include: a first appliance, of a series of appliances designed to incrementally implement a treatment plan, having an arch element shaped to span at least a portion of the surface of a patient's palate, wherein the arch element is designed to expand an arch of the teeth of the patient, wherein the arch element has a width specific to a first stage of the treatment plan and one or more tooth engagement structures and wherein each structure contacts at least one of a surface of a tooth or a surface of the patient's gingiva and imparts a force thereto. A second appliance, of the series of appliances, can include: a second arch element shaped to span at least a portion of the surface of a patient's palate, wherein the second arch element is designed to expand the arch of the teeth of the patient, wherein the arch element has a width specific to a second stage of the treatment plan and one or more tooth engagement structures and wherein each structure contacts at least one of a surface of a tooth or a surface of the patient's gingiva and imparts a force thereto.

Figure 1B:
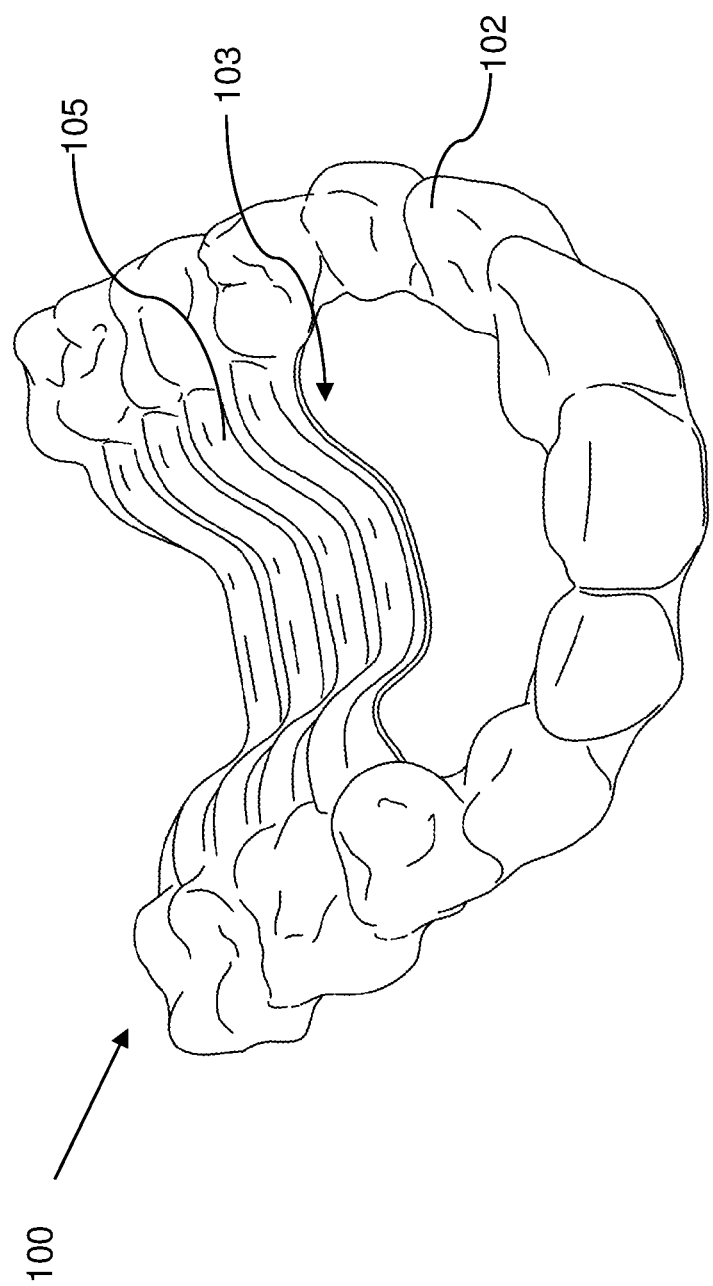
FIG. 1B illustrates another example of an appliance having a structural reinforcement feature provided thereon according to a number of embodiments of the present disclosure.

FIG. 1B illustrates an example of an appliance according to a number of embodiments of the present disclosure. Similar to the embodiment illustrated in FIG. 1A, the appliance 100, illustrated in the embodiment of FIG. 1B, can be utilized as an upper dentition appliance (e.g., an appliance placed on the upper jaw of the patient).

In accordance with some embodiments of the present disclosure, the appliance 100 can include a removable shell 102 formed of a first material having a number of cavities formed therein. As discussed above, the number of cavities can be shaped to receive teeth of the patient.

The appliance 100 can include an arch element 103 extending from the removable shell 102 in a lingual direction and across at least a portion of the arch width of the removable shell 102. The arch width of the removable shell 102, as used herein, is a space between the cavities of the removable shell 102.

For instance, the arch element 103 can span across a surface of the mouth of the patient when the dental appliance 100 is placed over the teeth of the patient. The surface of the mouth can include, for instance, a palate and/or floor of the mouth. In such an embodiment, the arch element is designed to expand an arch of the teeth of the patient, wherein the arch element has a width specific to a stage of a treatment plan. Accordingly, in some embodiments, the width of the arch element is wider than an arch width of the teeth of the patient.

The arch element, as illustrated by FIG. 1B, can be fabricated having a structural reinforcement feature thereon. In the example of FIG. 1B, a number of ridges and valleys 105 are formed on the arch element 103.

The ridge and valley structure 105 can be used to provide additional rigidity to the arch element which can allow more force to be provided. In this manner, the dental appliance can be utilized to perform more applications, such as to move palatal plates, move teeth outward, and/or maintain the teeth and/or jaw in a particular orientation while musculature and bone are adjusting to the orientation and to prevent movement of the teeth or jaw back toward their initial orientation.

Although two examples of structural reinforcement features are illustrated in FIGS. 1A and 1B, any suitable structural reinforcement feature can be utilized that will increase the rigidity of the arch element.

Figure 2:
FIG. 2 illustrates an example of an appliance embodiment according to the present disclosure.

FIG. 2 illustrates an example of an appliance embodiment according to the present disclosure. In the embodiment of FIG. 2, the shell 202 of the appliance 200 has cavities to accept less than all of the teeth of the patient's jaw. For instance, in FIG. 2, the appliance has cavities for the molars of the patient. This can be beneficial as it will only apply for to those teeth, thereby focusing the forces imparted by the appliance to those teeth that are in need of adjustment at this stage in the patient's treatment. In the embodiment of FIG. 2, the appliance has an arch element 204 with a smooth surface. Embodiments of the present disclosure can be created in a variety of ways.

For example, in some embodiments, an arch element can be formed of a material using a virtual model of a palate of a patient and a virtual model of a number of teeth of the patient. The arch element can be wider than an arch width of the number of teeth of the first jaw of the patient, specific to a stage of a treatment plan, and can be shaped to substantially follow contours of the palate of the patient (that may also include modeling of anticipated changes to the palatal contours due to tissue stretching), for instance.

The palatal contours in the model can also be specifically raised in a vertical direction so that any appliance which is formed over the model is slightly raised in comparison to the actual contours of the palate. In other words, a slight gap between the actual palate and the palatal coverage portion of the appliance can be designed to be present. This gap allows the transverse benefits of the appliance design to be in effect while not necessarily requiring an exact fit of the appliance to the contours of the tissue.

A slight offset in the vertical dimension can minimize any disruption in speech, swallowing, or feel due to changes in tongue position that may result in the alteration. More importantly, intentionally raising the vertical dimension of only the palatal tissue regions has the benefit of not needing perfect modeling of any non-linear stretching that might take place in the tissue. This can greatly reduce the risk of uncomfortable pressure spots and sores caused by the appliance. Having to relieve pressure spots in the appliance can be very time consuming for the doctor, and if the appliance is thin to begin with, such adjustments can lead to weakened areas in the appliance.

A virtual model of a number of teeth of the patient can, for example, include an initial virtual dental model and/or an intermediate virtual dental model. A virtual model of the palate (and/or other tissue surfaces of the patient's mouth) can include the contours of the palate. In some embodiments, the virtual model of the palate and the virtual model of the number of teeth can include a single virtual model and/or two separate virtual models.

The arch element can be formed by a rapid prototyping process, such as, for example, by a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry.

The arch element can be shaped to fit between the arch of the first jaw of the patient while being sized to be wider than the arch width of the number of teeth of the first jaw of the patient.

In some embodiments, the flexibility of the appliance is such that it can be compressed in the transverse direction during seating in order to activate the expansion force. This force then gets released and directed towards the teeth, soft tissues, and/or jaw bone when then the appliance is seated in the mouth.

As discussed above, in some embodiments, the arch element can be shaped to substantially follow contours of the palate of the patient using the virtual model of the palate. Alternatively and/or in addition, the arch element can be shaped to substantially follow contours of the floor of the mouth of the patient using a virtual model of the floor of the mouth.

To form an appliance, a removable shell can, for example, be formed over a set of molded teeth. The removable shell can include a number of cavities formed therein, wherein the number of cavities are shaped to receive the number of teeth of the patient. In various embodiments, the removable shell can include a second portion of the arch element formed of the same material as the number of cavities. The second portion of the arch element can be formed integrally with and/or during a same process as the number of cavities, for instance.

The material forming the first portion of the arch element can be more rigid than the material forming the second portion of the arch element, for instance. In some embodiments, the second portion of the arch element can include the same width as the first portion of the arch element.

Alternatively and/or in addition, the first portion of the arch element can be designed to be adjacent to and/or in contact with a surface of the patient's mouth (e.g., the palate and/or floor of the patient's mouth) when the dental appliance is placed over the teeth of the patient. The second portion of the arch element can be designed to be adjacent to and/or in contact with a tongue of the patient when the dental appliance is placed over the teeth of the patient.

The dental appliance can be made, for example, by thermoforming a piece of plastic over a physical dental model. The physical dental model, for instance, can represent an incremental position to which a patient's teeth are to be moved. This desired position of the patient's teeth includes any underlying desired changes to the skeletal structure which holds the teeth in place.

The physical dental models can be manufactured by downloading a Computer-aided Design (CAD) virtual dental model file into a rapid prototyping process, such as, for example, a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry. The virtual dental model can be hollowed out or "shelled" before it is sent for manufacturing to save on material cost if printed, for example.

The dental model (e.g., set of molded teeth) can be created from a virtual model of a number of teeth of a patient. A dental model can be formed in accordance with a unique treatment file that identifies a patient, a stage of a treatment plan, the virtual model of the number of teeth, and/or whether the dental model is of the upper and/or lower dental arch.

In some embodiments, a treatment file can be accessed by a rapid prototyping apparatus machine, such as a SLA or printing, to form and/or create the dental model. The result of the dental model can include a set of molded teeth (e.g., a physical set of molded teeth). The set of molded teeth can include at least a replica of a number of teeth of the patient. The dental model can be used to make a dental appliance, for example, by creating a negative impression of the dental model using polymeric sheets of material and vacuum forming heated sheets of the polymer over the dental model, as discussed above.

For instance, a dental appliance can be created by layering a thermoformable sheet of material and/or multiple sheets of one or more materials over the dental model. The materials can include at least one polymeric material, for instance.

Generally, the dental appliance can be produced and/or formed, for example, by heating the polymeric thermoformable sheet and vacuum or pressure forming the sheet over the dental model (i.e., over a number of the teeth in the mold). The shape of the sheet of material can be designed to intentionally vary in thickness in some portions of the sheet (beyond natural variations in thickness during the shaping process) as it conforms to the mold shape. A dental appliance can, for example, include a negative impression of the dental model. The appliance and/or parts thereof may be transparent, semi-transparent, or opaque in such a way as to emulate a natural tooth shade.

Figure 3:
FIG. 3 illustrates virtual model of an appliance according to a number of embodiments of the present disclosure.

FIG. 3 illustrates virtual model of an appliance according to a number of embodiments of the present disclosure. As illustrated by the embodiment of FIG. 3, the virtual dental appliance 300 can include a removable shell 302, an arch element 304.

The removable shell 302 can include a number of cavities formed therein, wherein the number of cavities are shaped to receive the number of teeth of the patient. The removable shell 302, as illustrated in FIG. 3, can include a virtual removable shell, a physical removable shell, and/or material to be thermoformed over a dental model (e.g., as discussed further herein).

The model of the lower jaw, can include a virtual model of a surface of the mouth of the patient including a virtual model of the number of teeth of patient. The virtual model (e.g., the model of the lower jaw) can be used to print and/or mill the arch element.

Alternatively and/or in addition, the model of the lower jaw can include a physical set of molded teeth. A physical set of molded teeth can be created, for instance, utilizing a virtual model of the surface of the mouth and/or the teeth of the patient. The removable shell 302 can be formed over a physical set of molded teeth, in various embodiments.

Figure 4:
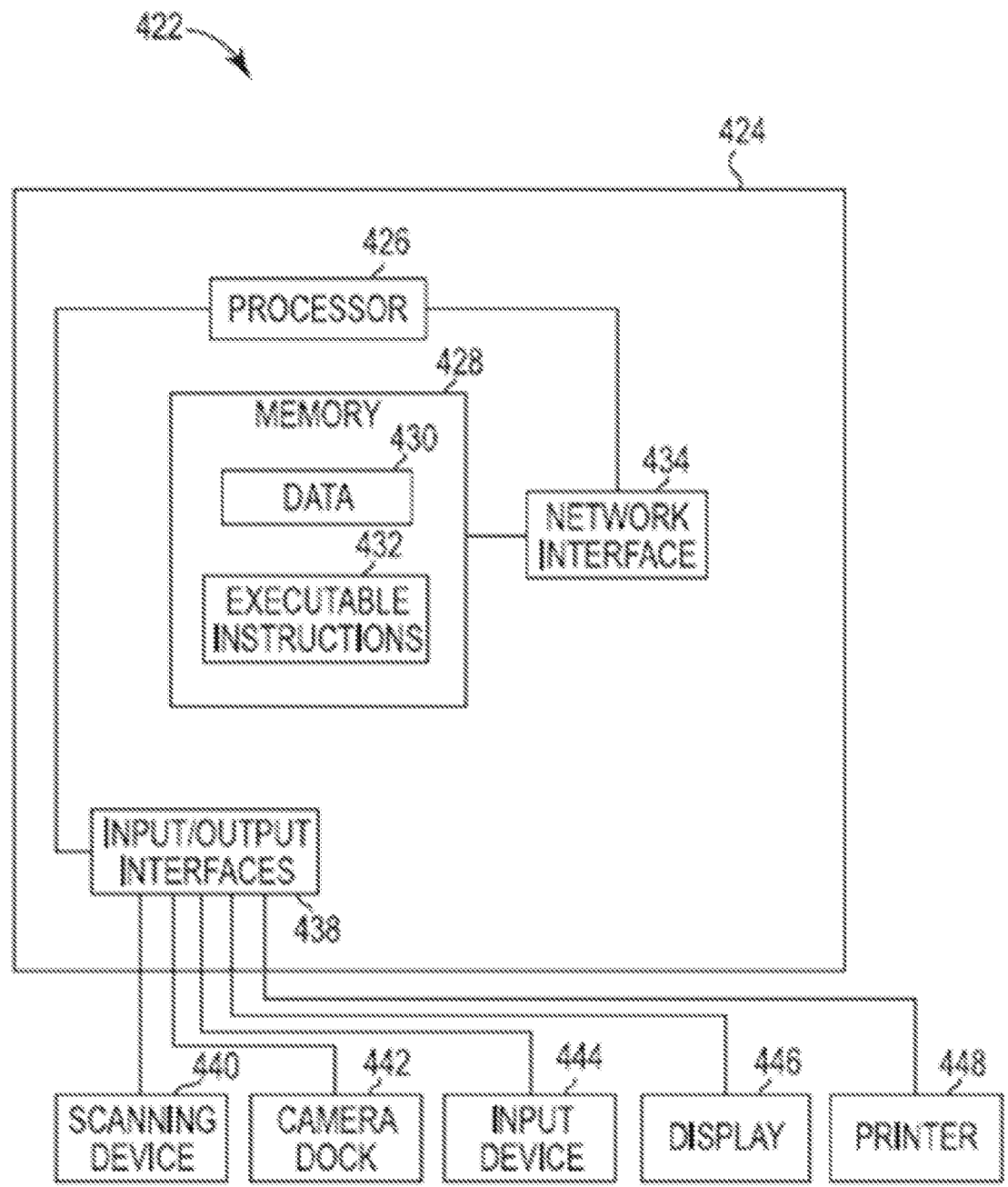
FIG. 4 illustrates an example computing device readable medium having executable instructions that can be executed by a processor to perform a method according to one or more embodiments of the present disclosure.

FIG. 4 illustrates an example computing device readable medium having executable instructions that can be executed by a processor to perform a method according to one or more embodiments of the present disclosure. For instance, a computing device 424 can have a number of components coupled thereto. The computing device 424 can include a processor 426 and a memory 428. The memory 428 can have various types of information including data 430 and executable instructions 432, as discussed herein.

The processor 426 can execute instructions 432 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 428 and/or the processor 426 may be located on the computing device 424 or off the computing device 424, in some embodiments. As such, as illustrated in the embodiment of FIG. 4, the computing device 424 can include a network interface 434. Such an interface 434 can allow for processing on another networked computing device, can be used to obtain information about the patient, and/or can be used to obtain data and/or executable instructions for use with various embodiments provided herein.

As illustrated in the embodiment of FIG. 4, the computing device 424 can include one or more input and/or output interfaces 438. Such interfaces 438 can be used to connect the computing device 424 with one or more input and/or output devices 440, 442, 444, 446, 448.

For example, in the embodiment illustrated in FIG. 4, the input and/or output devices can include a scanning device 440, a camera dock 442, an input device 444 (e.g., a mouse, a keyboard, etc.), a display device 446 (e.g., a monitor), a printer 448, and/or one or more other input devices. The input/output interfaces 438 can receive executable instructions and/or data, storable in the data storage device (e.g., memory), representing a virtual dental model of a patient's dentition.

In some embodiments, the scanning device 440 can be configured to scan one or more physical dental models of a patient's dentition. In one or more embodiments, the scanning device 440 can be configured to scan the patient's dentition and/or dental appliance directly. The scanning device 440 can be configured to input data into the computing device 424.

In some embodiments, the camera dock 442 can receive an input from an imaging device (e.g., a 2D or 3D imaging device) such as a virtual camera, a printed photograph scanner, and/or other suitable imaging device. The input from the imaging device can, for example, be stored in memory 428.

The processor 426 can execute instructions to provide a visual indication of a treatment plan, a dental appliance, and/or a portion of an arch element on the display 446. The computing device 424 can be configured to allow a treatment professional or other user to input treatment goals. Input received can be sent to the processor 426 as data 430 and/or can be stored in memory 428.

Such connectivity can allow for the input and/or output of data and/or instructions among other types of information. Some embodiments may be distributed among various computing devices within one or more networks, and such systems as illustrated in FIG. 4 can be beneficial in allowing for the capture, calculation, and/or analysis of information discussed herein.

The processor 426, in association with the data storage device (e.g., memory 428), can be associated with the data 430. The processor 426, in association with the memory 428, can store and/or utilize data 430 and/or execute instructions 432 for designing a virtual appliance for a specific stage of a treatment plan and/or a series of virtual appliances for a treatment plan. Such data can include the virtual dental model and/or virtual model of a surface of a patient's mouth (e.g., palate and/or floor of the mouth).

The processor 426 coupled to the memory 428 can cause the computing device 424 to perform a method including, for example, providing a virtual model of a dental appliance having a shell configured to reposition a number of teeth of a patient. The virtual model of the dental appliance can include a second portion of an arch element. In various embodiments of the present disclosure, the processor 426 coupled to the memory 428 can cause the computing device 424 to perform the method including providing a virtual model of a first portion of an arch element (e.g., as illustrated in FIG. 3).

The virtual model of the dental appliance can, in some embodiments, be used to create a physical dental appliance. For example, dental appliance structural data can be stored in memory and used by an appliance manufacturing device to fabricate an appliance based upon the dental structural data. For instance, the memory can contain executable instructions to operate a thermoforming or direct fabrication device to form a dental appliance using those techniques.

As discussed above, in some embodiments, the arch element, or a portion thereof, can be made from a second material that can be more rigid than the first material. For instance, the rigidity of the second material can apply a force to at least a portion of the number of teeth in a transverse direction (e.g., horizontal direction) to expand the arch of teeth of the patient. In some embodiments, the rigidity of the second material can generate a necessary palatal expansion force to un-fuse the suture of the maxilla and/or move the portions of the maxilla with respect to each other, among other uses as discussed herein.

In some embodiments, the first material of the arch element can form a first layer and the second material of the arch element can form a second layer (e.g., as illustrated in the embodiment of FIG. 5). The first layer of the first material can be formed integrally with and of a same material as the removable shell 102, for instance.

The second layer of the second material can be fabricated in a separate process and attached to the first layer of the first material, for example (e.g., as discussed further herein). In some embodiments, the second layer may be the same thickness or a thicker layer of the material of the first layer. In such embodiments, these two layers can be referred to as a first portion and a second portion of the arch element.

The first portion and the second portion of the arch element can be wider than the arch width of the number of teeth of the first jaw of the patient. For instance, the arch element can be shaped to substantially follow contours of the palate of the patient and/or the floor of the mouth of the patient, in some embodiments. The palatal contour in the model can be raised in order to result in a uniform relief gap between the appliance and the actual contour of the palate. The physical first portion can be formed of a material that is more rigid than the material forming the second portion.

In some embodiments, in order to direct force from the arch element to other portions of the shell, a more rigid material may be applied between the arch element and other portions of the shell (e.g., a rigid material is applied over and/or under the shell material or encapsulated within layers of shell material). Additionally, the rigid material used to form the arch element and/or force directing portions can be reinforced by a reinforcement material (e.g., a metallic sheet or wire material provided to the second material).

In one example method embodiment, the method of forming a dental appliance, includes: forming a first virtual arch element using physical data of a palate and a number of teeth of a patient, wherein the arch element is wider than an arch width of the number of teeth of a first jaw of the patient, specific to a stage of a treatment plan and forming one or more virtual tooth engagement structures connected to the arch element and wherein each structure contacts a surface of a virtual tooth and imparts a virtual force thereto. Such embodiments can further include forming a second virtual arch element using physical data of a palate and a number of teeth of a patient, wherein the second arch element corresponds impart a force on one or more teeth according to a second stage of the treatment plan and replacing the first virtual arch element with the second virtual arch element.

The second virtual arch element can be formed, for example, by using physical data of a palate and a number of teeth of a patient, wherein the second arch element corresponds impart a force on one or more teeth according to a second stage of the treatment plan. Second one or more virtual tooth engagement structures connected to the second virtual arch element using physical data of a palate and a number of teeth of a patient can be formed, wherein the second one or more tooth engagement structures correspond to move one or more teeth according to a second stage of the treatment plan.

In some embodiments, prior to forming the second one or more virtual tooth engagement structures that correspond to move one or more teeth according to a second stage of the treatment plan, the location of the teeth is calculated based upon a movement of an arch of the patient accomplished by one or more estimated forces applied by the first arch element and first one or more virtual tooth engagement structures. This can be beneficial in better matching the virtual adjustment of the patient's mouth to what will actually occur in the patient's mouth, among other benefits.

In some embodiments, the method can further include defining a space between two virtual teeth or a virtual tooth and another feature of a patient's mouth based upon a calculated movement of an arch of the patient accomplished by one or more estimated forces applied by the first arch element and first one or more virtual tooth engagement structures and designing the second virtual tooth engagement structures to maintain the defined space. This can be beneficial wherein a space will be needed at a later time in treatment and/or as teeth are erupting, among other benefits.

As noted herein in some embodiments, the virtual appliance or data therefrom can be used to fabricate a physical appliance to be used in a patient's mouth. For example, in some embodiments, a method can further include forming a physical arch element based on the virtual arch element and one or more physical tooth engagement structures connected to the arch element and wherein each structure contacts a surface of a virtual tooth of a patient and imparts a virtual force thereto.

It should be noted that when first and second are used to describe items in this disclosure, it is only meant that one item comes before the next and does not indicate that the items be the first and second items in a series of multiple items. For example, a first item may be the third item in a series of items and the second item may be the sixth item in a series and the terms first and second are used to indicate that the first comes before the second in the series even though there may be more items in the series.

FIG. 5 illustrates an example of an appliance having a structural reinforcement material according to one or more embodiments of the present disclosure. In the embodiment of FIG. 5, the appliance 500 is shown at two different perspectives. The arch element 504 includes multiple materials (e.g., a first material layer which, in this case, is the same type of material as the shell 502, and a second material layer 508, which is a different material).

The first portion of the arch element can be connected to the second portion of the arch element to form the dental appliance. The arch element can, for example, be designed to provide a force to at least a portion of the number of teeth in a transverse direction to expand the arch of the teeth of the first jaw of the patient.

The first portion of the arch element and the second portion of the arch element can be connected in a variety of ways, in accordance with some embodiments of the present disclosure. For instance, the first portion of the arch element can be connected to the second portion of the arch element by thermoforming the removable shell over the set of molded teeth with the first portion of the arch element placed within the set of molded teeth (i.e., encapsulated by).

In some embodiments, an agent (e.g., a binding material) can be added to connect the first portion of the arch element to the second portion of the arch element created by thermoforming the removable shell. The first and second portions may also be secured to each other through ultrasonic welding or other techniques that allow adhesion without the need for an intermediary substrate such as a solvent or adhesive.

In accordance with some embodiments of the present disclosure, the first portion of the arch element can be connected to the second portion of the arch element by adhering the first portion and the second portion subsequent to forming the first portion of the arch element and the removable shell. In some embodiments, an agent can be utilized to cause the first portion of the arch element to adhere to the second portion of the arch element, however, in some embodiments, multiple materials used to form the first portion and second portion may be bonded without the use of an agent (e.g. ultrasonic welding, laser spot welding). The first portion can also be cured into place in direct contact with the dental model (e.g. a liquid resin such as polyacrylic painted onto the model and subsequently hardened through chemical or light cure) and then joined to the second material which is thermoformed over the first material to create an adherent bond between the two materials.

In various embodiments, the first portion can include a number of features (e.g., as discussed further herein). Connecting the first portion to the second portion of the arch element can include thermoforming the removable shell over the set of molded teeth with the first portion of the arch element placed within the set of molded teeth. The thermoformed material (i.e., the material the removable shell is formed of) can surround the number of features of the first portion of the arch element to connect the first portion to the second portion of the arch element.

The removable shell 502 can include the number of cavities and a second portion of the arch element 506. The second portion of the arch element 506 can be formed concurrently with and/or of the same material as the cavities, for instance, using the model of the lower jaw. The material forming the first portion of the arch element 504 can be more rigid than the material forming the second portion of the arch element 506.

The first portion of the arch element 504 can be connected to the second portion of the arch element 506 to form a dental appliance. For example, the first portion of the arch element 504 can be placed within the physical set of molded teeth (e.g., the model of the lower jaw). An agent can be added to the second portion of the arch element. The first portion of the arch element 504 and the second portion of the arch element 506 can be connected as the removable shell 502 is thermoformed over the set of molded teeth. That is, the first portion of the block element 504 can be encapsulated in the set of molded teeth and can be adhered to the second portion of the arch element 506 utilizing an agent.

Alternatively, the first portion of the arch element 504 can be connected to the second portion of the arch element 506 subsequent to forming the first portion of the arch element 504 and the removable shell 502. For instance, the removable shell 502 can be thermoformed over the physical set of molded teeth. Subsequently, the first portion of the arch element 504 can be adhered to the second portion of the arch element 506. The portions of the arch element 504, 506 can be adhered using an agent or through means not requiring an agent (such as ultrasonic welding), for instance.

Some embodiments of the present disclosure can be provided in multiple parts. This can be beneficial, for example, where the palate has been expanded, but the movement of teeth, by the cavities and other appliance structures is still ongoing. In such cases, an appliance such as that shown in FIG. 6A or 6B, may be suitable.

Figure 6A:
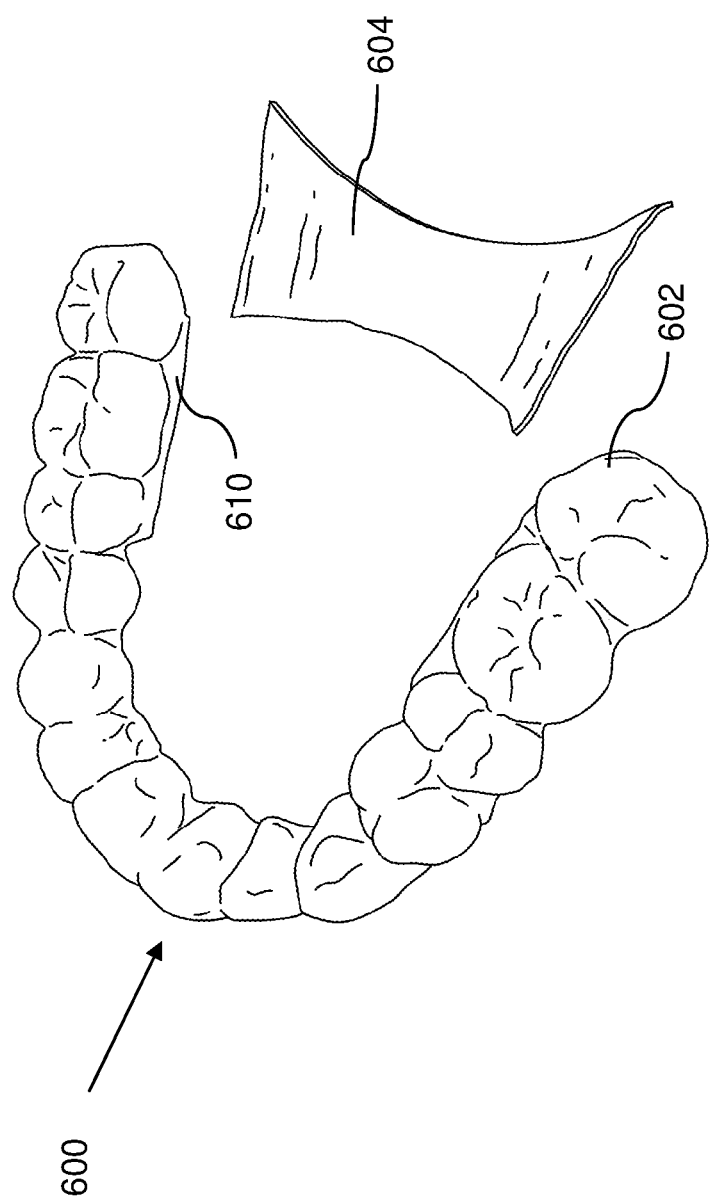
FIG. 6A illustrates an example of an appliance having a removable arch element according to a number of embodiments of the present disclosure.
Figure 6B:
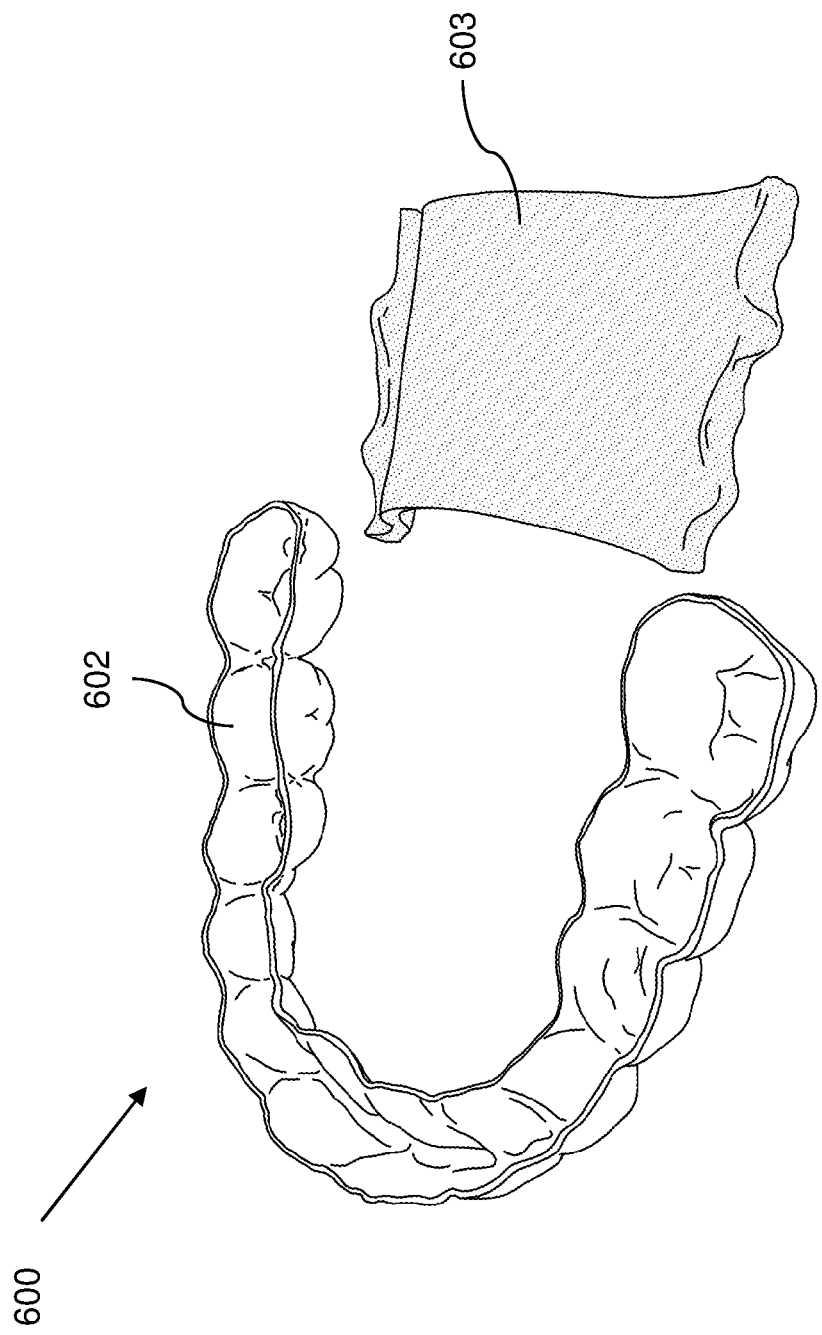
FIG. 6B illustrates an example of an appliance having a removable arch element according to a number of embodiments of the present disclosure.

FIGS. 6A and 6B illustrate an example of an appliance having a removable arch element according to a number of embodiments of the present disclosure. In the embodiments of FIGS. 6A and 6B, the appliance 600 has a shell 602 with a mounting element 610 (as shown in FIG. 6A) thereon to engage the arch element 604.

The mounting element and arch element can be affixed together by any suitable mechanism and can be either releasably or permanently affixed together. Some examples of affixation mechanisms include, sliding a flange into a slot, placing a tab into an aperture, chemical bonding, adhesive bonding, among many other affixation mechanisms. In the embodiment of FIG. 6A, the edges of the arch element that will be adjacent to the shell can be slid into a notch or channel formed in the shell (the embodiment of FIG. 6A has a raised channel formed therein). This engagement can be mechanically fixed (by a locking mechanism or frictional engagement or by bonding the two parts together chemically or with an adhesive.

In the embodiment of FIG. 6B, an arch element 603 is attached to a shell 602 to form an appliance 600. In this embodiment, the arch element 603 is formed from a material different than that of shell 602.

Materials having different characteristics can be added or in some embodiments, one arch element can be interchanged with another. For example, if it is desired that the arch element be more rigid than the shell, then a more rigid material may be used (as in this embodiment) or added as a layer (to an arch element of one or more other materials, such as that of FIG. 6A or FIG. 9) to add rigidity to the arch element. In another embodiment, the arch portion of the appliance may already have rigidity, but may lose its rigidity over time, so an arch element of a different material can be added to provide resiliency which may extend the period in which the original arch material may be usable for its purpose.

In various embodiments, a first arch element can be used and then a second arch element having a different characteristic may be affixed in place of the first arch element. For example, an arch element having a first force providing physical characteristic may be utilized and then that arch element may be removed from the appliance and replaced by an arch element having a second force providing characteristic. This can be beneficial in embodiments where the shell can be reused from one phase of treatment to another and as such, the arch element can be replaced rather than an entirely new appliance having to be fabricated and used. The different characteristic can be different from one or both of the shell and/or the first arch element. Examples of different physical characteristics include: rigidity, resiliency, color, and thickness profile (thickness at any point along the second arch element may be different than the thickness at a corresponding point on the first arch element).

In some embodiments, the arch element can be removed and the appliance can continue to be worn in the patient's mouth without the arch element. In such embodiments, the appliance can, for example, continue to maintain the position of one or more teeth and/or can continue to adjust the position and/or orientation of one or more teeth.

FIG. 7 illustrates an example of an appliance having an anterior tab arch element according to a number of embodiments of the present disclosure. FIG. 7 provides an appliance 700 having a shell 702 with a tab 705 thereon to provide additional rigidity and/or palate expansion force. The anterior tab 705 is a small tab on lingual side of arch. It may be used to increase structural integrity of the appliance in the transverse direction between the two ends of the jaw. In some embodiments, lingual tab feature may run along one or more portions of or the entire span of arch. The cross sectional geometry of the lingual tab can be varied uniformly or non-uniformly along its length to provide additional rigidity and/or force to adjust the palate.

Figure 8:
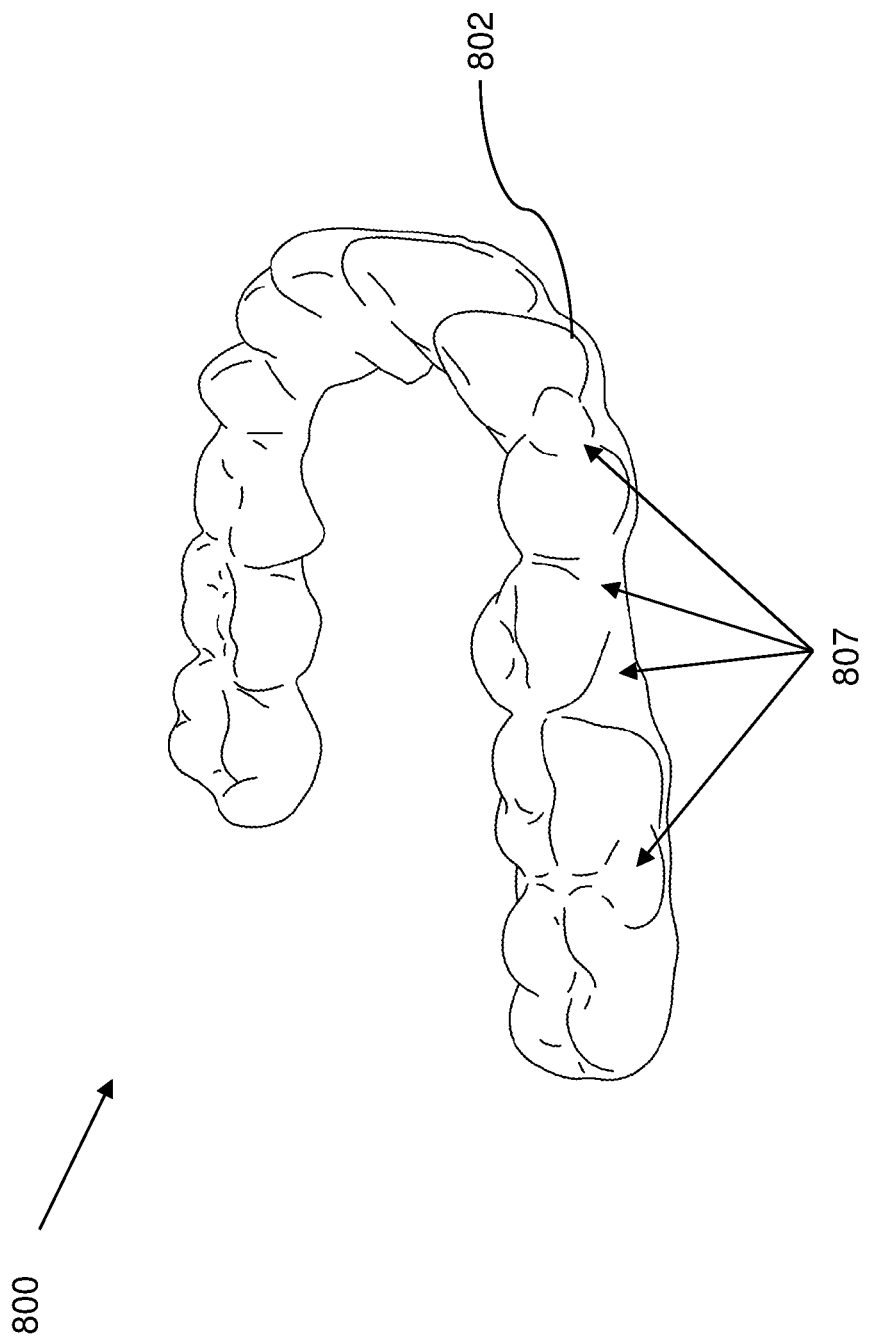
FIG. 8 illustrates an example of an appliance having a rib feature according to a number of embodiments of the present disclosure.

FIG. 8 illustrates an example of an appliance having a rib feature according to a number of embodiments of the present disclosure. FIG. 8 provides an appliance 800 that has one or more rib features 807 on the surface of the shell 802. These features are areas that are thicker than other portions of the appliance body thickness and therefore provide addition rigidity and/or force.

Additionally, the ribs are elongate shapes that can be oriented in different directions along the surface of the shell 802. This enables them to provide forces in specialized directions to precision the forces provided to the teeth from the appliance. In the illustrated embodiment, of FIG. 8, the ribs have been thermoformed in a particular geometry (planned through the aid of the executable instructions in the computing device) to provide added rigidity to the posterior section of the dental appliance.

For example, in some embodiments, a rib feature can be positioned in the buccal and/or lingual sections between the cavities for the crowns to strengthen the appliance in the transverse direction, so individual teeth can be moved as a segment. In a mixed dentition case, if a primary tooth is lost during treatment, such an embodiment can help preserve the palatal expansion force, since the posterior section is being expanded as a segment.

FIG. 9 illustrates an example of an appliance having an arch element connecting the posterior sides of the arch according to a number of embodiments of the present disclosure. In the embodiment of FIG. 9, the appliance 900 includes a shell 902 with an arch element 904 spanning across the palate. In this embodiment, the arch element 904 does not cover the entire palate of the patient, but rather, spans a portion of the palate and leaving a portion uncovered. Such an embodiment may be more comfortable for the patient and may be easier to place and remove, among other benefits.

FIG. 10 illustrates an example of an appliance having a full palatal arch element according to a number of embodiments of the present disclosure. In the embodiment of FIG. 10, the appliance 1000 includes a shell 1002 with an arch element 1004 spans the entire palate surface (in the anterior-posterior direction between the left and right jaw portions of the shell 1002. In this embodiment, the arch element 1004 spans the entire palate of the patient (up to the back edge if the back molars or the molars that are second from the back). Such an embodiment may be easier to manufacture and will reduce edges that may be uncomfortable to the patient, among other benefits.

FIG. 11 illustrates an example of an appliance having an extended gingival feature thereon according to a number of embodiments of the present disclosure. The embodiment of FIG. 11 provides an appliance 1100 including a shell 1102 having an extended gingival feature 1109 to provide additional rigidity and/or palate expansion force.

The extended gingival feature 1109 is an extension of the appliance that is contoured to follow the shape of the gingiva. This type of arch element may be used to increase structural integrity of the appliance in the transverse direction between the two ends of the jaw. In some embodiments, extended gingival feature may run along one or more portions of or the entire span of arch.

Further, the cross sectional geometry of the extended gingival feature can be varied uniformly or non-uniformly along its length to provide additional rigidity and/or force to adjust the palate. For example, the extended gingival feature can be shaped to match the contour (e.g., in two or three dimensions) of the physical gingiva upon which the extended gingival feature will be placed.

The extension of the gingival cut line at the time of manufacturing may accomplish what the anterior tab feature does by using the actual gingival surface to support the transverse force to increase the rigidity of the appliance and/or provide force to adjust the palate in the transverse direction. This feature may also help with appliance retention for short crowns found in mixed dentition cases, among other benefits.

Embodiments of the present disclosure can also provide other beneficial functions. For example, embodiments can maintain space in the patient's mouth when the patient's primary and permanent dentition have a size discrepancy.

For instance, unlike the anterior teeth, the permanent premolars may be smaller than the primary teeth they replace. On average, the mandibular primary second molar is 2 mm larger than the second premolar and, in the maxillary arch, the primary second molar is only 1.5 mm larger. The primary first molar is only 0.5 mm larger than the first premolar. Accordingly, on average, this results in 2.5 mm of space, called leeway space, in the mandibular arch and 1.5 mm in the maxillary arch. The leeway space is usually taken by mesial movement of the permanent molars (the permanent first molars move mesially relatively rapidly).

This creates an opportunity to gain arch length and relieve crowding by stopping the first molar mesial movement by, for example, using a pontic along with the appliance by filling the appliance tooth space and leaving clearance for erupting tooth. The filled pontic material can be used to keep the first molar from moving into the leeway space while allowing the permanent premolar to erupt.

Figure 12A:
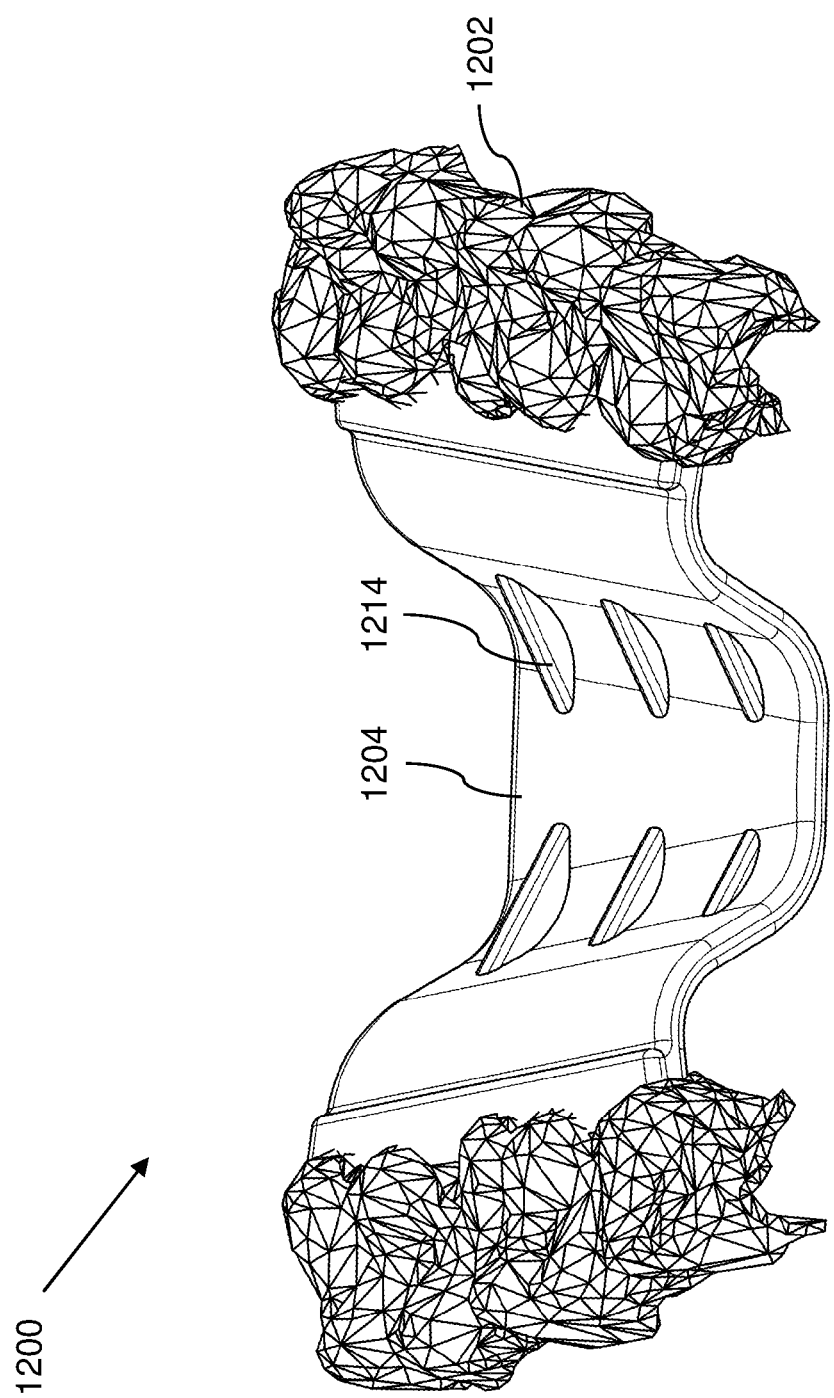
FIG. 12A illustrates an example of an appliance according to a number of embodiments of the present disclosure.
Figure 12B:
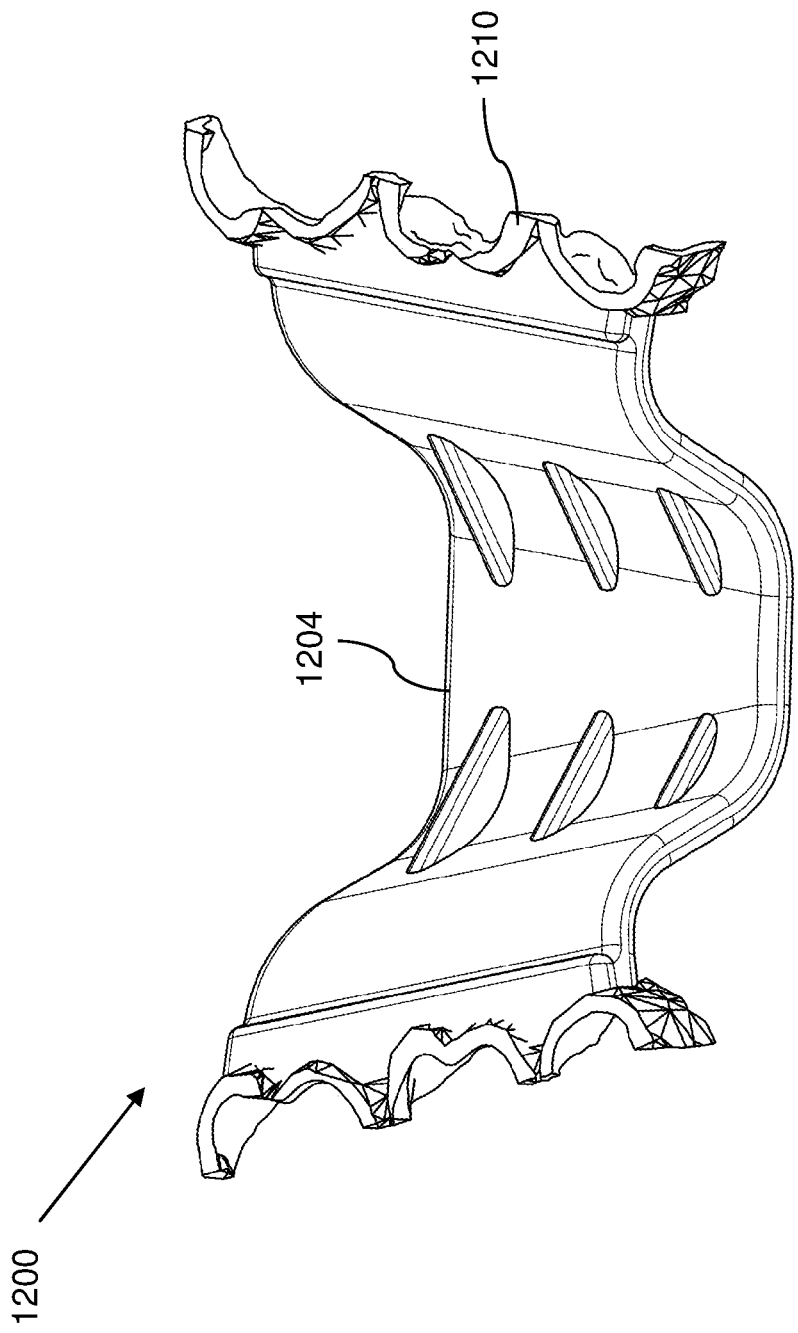
FIG. 12B illustrates an example of an appliance according to a number of embodiments of the present disclosure.
Figure 12C:
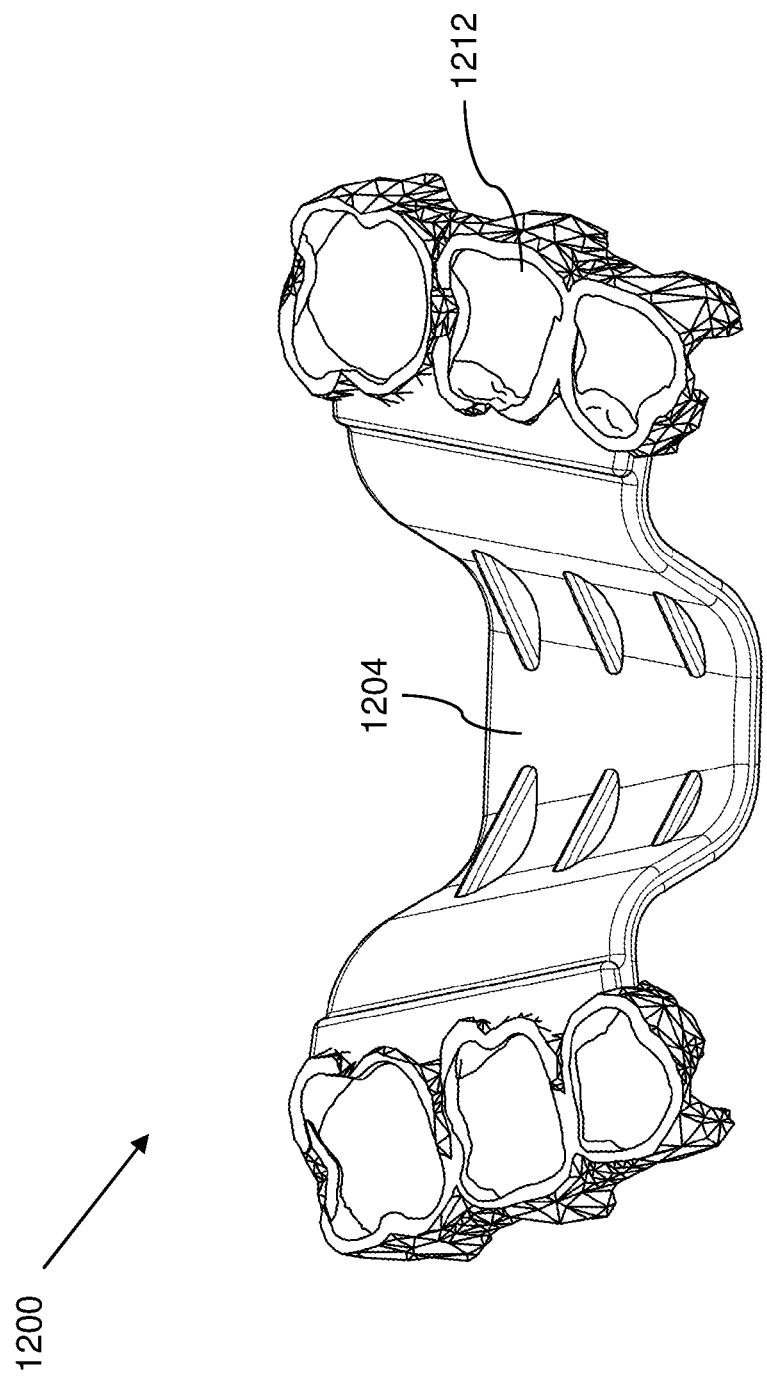
FIG. 12C illustrates an example of an appliance according to a number of embodiments of the present disclosure.

FIGS. 12A, 12B, and 12C illustrate examples of appliances according to a number of embodiments of the present disclosure. In the embodiment of FIG. 12A, an appliance 1200 has one or more tooth engagement structures, in this case, a shell 1202 with cavities, and an arch element 1204 formed thereon. Also illustrated in the embodiment of FIG. 12 A are structural reinforcement features in the form of struts 1214. These features can be positioned in various places on the arch element to increase the rigidity of the arch element.

This may be a design that can be produced directly from a virtual model, through processes as discussed above, either as a single piece or as one or more shell and arch pieces that can be affixed together. In the embodiment of FIG. 12B, the appliance 1200 does not have a shell, but rather has an arch element 1204 and one or more tooth engagement structures 1210 to contact a surface of a tooth and impart force thereto.

It should be noted that in some embodiments, portions of the appliance may not be visible to people when they see the appliance in the patient's mouth and as such the material does not have to be clear, and this therefore allows for more options with regard to the choice of material that can be utilized. With some manufacturing processes, as discussed herein, the appliance can be fabricated from multiple materials or can be manufactured in parts wherein the parts are made from different materials and are attached together to create the appliance.

The tooth engagement structure may extend along a small portion of the side surfaces of the tooth or may extend substantially around the side surfaces of the tooth, as shown in FIG. 12C. In the embodiment of FIG. 12C, the tooth engagement structures 1212 extend around the entire side surfaces of the tooth to surround the tooth.

Such embodiments may provide more secure fitment of the appliance in the mouth of the patient, may be able to impart more force, and may be able to control that application of that force in one or more directions with respect to the tooth. This may, in some instances, allow the position or orientation of a tooth to be adjusted while the appliance is expanding the palate of the patient.

In some embodiments, the appliance can be overlayed over an existing appliance used to adjust tooth positioning and/or orientation. For example, in an embodiment such as the one illustrated in FIG. 12A, the cavities 1202 can be sized to fit over cavities of an aligner appliance used for aligning one or more teeth or a retainer appliance used to maintain the position of one or more teeth. The aligner appliance and/or the arch adjustment appliance may have features thereon to lock the two appliances together or they may be affixed together by other means (e.g., frictionally and/or via adhesives, etc.).

As discussed herein, multiple piece embodiments can be potentially beneficial, for example, because they can be designed to have a removable portion. For instance, the lingual side connection feature can be affixed (e.g., thermoformed) on the surface of the appliance. A rigid piece, spanning across the palate, can be snapped into place and removed as needed. Alternatively, in some embodiments, a wire or spring can be used instead of the rigid piece.

In embodiments where the pieces are permanently affixed, a lingual side connection feature can be affixed (e.g., thermoformed) on the surface of the appliance to position a rigid piece spanning across the palate so it can be secured to an appliance (e.g., with adhesive). Alternatively, a wire or spring can be used instead of the rigid piece, in some embodiments.

In one such embodiment, the appliance includes an arch element shaped to span at least a portion of the surface of a patient's palate, wherein the arch element is designed to expand an arch of the teeth of the patient, wherein the arch element has a width specific to a stage of a treatment plan and one or more tooth engagement structures and wherein each structure contacts at least one of a surface of a tooth or a surface of the patient's gingiva and imparts a force thereto. In some such embodiments, one or more tooth engagement structures is a removable shell having a number of cavities formed therein, wherein the number of cavities are shaped to receive teeth of a patient.

As shown in FIG. 12B, the tooth engagement structure can extend along a portion of at least one side surface of a tooth. Further, in the embodiments of FIGS. 12A and 12C, the tooth engagement structure can extend substantially around the side surfaces of the tooth (in the embodiments of FIGS. 12A and 12C it extends all the way around) to surround the tooth.

Although the discussion above is focused on arch expansion, in some instances the arch will need to be contracted and embodiments of the present disclosure can be utilized for arch contraction cases as well. For example, in a method embodiment, the method can include a method of forming a dental appliance, including forming a first virtual arch element using physical data of a palate and a number of teeth of a patient, wherein the arch element is narrower than an arch width of the number of teeth of a first jaw of the patient, specific to a stage of a treatment plan, forming one or more virtual tooth engagement structures connected to the arch element and wherein each structure contacts a surface of a virtual tooth and imparts a virtual force thereto. In various embodiments such as those illustrated in the Figures, the tooth engagement structure can be constructed and arranged to impart force to move the tooth either positionally or orientationally or both while the appliance is adjusting (i.e., expanding or contracting) the palate of the patient.

Other benefits of embodiments of the present disclosure can include, but are not limited to: arch form control wherein the appliance has structural integrity to modify or control mandible or maxilla shape. The use of an upper and lower appliance set allows for alignment of the arch shape in either or both arches. Embodiments can also provide structural integrity to enhance and control growth as a patient matures, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a dental appliance, comprising:
   forming a virtual arch element using a virtual dental arch of a patient, the virtual dental arch including a palate and a number of teeth of the patient's jaw, wherein the virtual arch element is wider than an arch width across the virtual dental arch; and
   forming one or more virtual tooth engagement structures connected to the virtual arch element, each of the one or more virtual tooth engagement structures configured to engage with teeth on opposing sides of the virtual dental arch, wherein the virtual arch element extends from the one or more virtual tooth engagement structures in a lingual direction so that, when the one or more virtual tooth engagement structures are engaged with the teeth on opposing sides of the virtual dental arch, the virtual arch element spans across the palate and applies a virtual force on the teeth on opposing sides of the virtual dental arch in accordance with a stage of a treatment plan.

2. The method of claim 1, wherein forming the one or more virtual tooth engagement structures includes forming a removable shell that includes a number of cavities formed therein, wherein the number of cavities are shaped to each receive one or more teeth of the patient.

3. The method of claim 1, wherein the virtual arch element is a first virtual arch element, the method further including forming a second virtual arch element using the virtual dental arch of the patient, wherein the second virtual arch element is configured to replace the first virtual arch element and is shaped to impart a second virtual force on the teeth on opposing sides of the virtual dental arch according to a second stage of the treatment plan, wherein the second virtual arch element is wider than the first virtual arch element as measured in the lingual direction across the palate.

4. The method of claim 1, wherein the virtual arch element is a first virtual arch element and the one or more virtual tooth engagement structures is a first one or more virtual tooth engagement structures, the method further including:
forming a second virtual arch element using the virtual dental arch of the patient, wherein the second virtual arch element is shaped to impart a second virtual force on the teeth on opposing sides of the virtual dental arch according to a second stage of the treatment plan, wherein the second virtual arch element is wider than the first virtual arch element as measured in the lingual direction across the palate; and
forming a second one or more virtual tooth engagement structures connected to the second virtual arch element using the virtual dental arch of the patient, wherein the second one or more virtual tooth engagement structures are shaped to move at least one of the number of teeth of the virtual dental arch according to the second stage of the treatment plan.

5. The method of claim 4, further including, prior to forming the second one or more virtual tooth engagement structures that move the at least one of the number of teeth according to the second stage of the treatment plan, calculating a location of the at least one of the number of teeth based upon a movement of an arch of the patient accomplished by one or more estimated forces applied by the first virtual arch element and the first one or more virtual tooth engagement structures.

6. The method of claim 5, further including wherein the method further includes defining a space between two virtual teeth or a virtual tooth and another feature of a patient's mouth based upon a calculated movement of the arch of the patient accomplished by the virtual force applied by the first virtual arch element and the first one or more virtual tooth engagement structures and designing the second one or more virtual tooth engagement structures to maintain the defined space.

7. The method of claim 1, further including forming a physical arch element based on the virtual arch element, and forming one or more physical tooth engagement structures connected to the physical arch element.

8. The method of claim 1, wherein the virtual arch element is releasably connectable to the one or more virtual tooth engagement structures via a mounting element.

9. The method of claim 1, wherein forming the virtual arch element includes calculating movement of the number of teeth accomplished by the applied virtual force.

10. The method of claim 1, wherein forming the one or more virtual tooth engagement structures comprises shaping the one or more virtual tooth engagement structures to apply virtual straightening forces on one or more virtual teeth of the virtual dental arch to correct tooth misalignment.

11. The method of claim 1, further comprising forming the dental appliance having an arch element and one or more tooth engagement structures corresponding to the virtual arch element and the virtual tooth engagement structures.

12. The method of claim 11, wherein the arch element and the one or more tooth engagement structures are made of a same material.

13. The method of claim 1, wherein forming the one or more virtual tooth engagement structures comprises forming a mounting element on the one or more virtual tooth engagement structures, the mounting element configured to engage with the virtual arch element to couple the virtual arch element with the one or more virtual tooth engagement structures.

14. The method of claim 1, wherein the virtual force ranges from 3 N to 9 N.

15. A method of forming a dental appliance, comprising:
forming a virtual arch element based on a virtual dental arch of a patient, wherein the virtual arch element is wider than an arch width across a palate of the virtual dental arch; and
forming one or more virtual tooth engagement structures connected to the virtual arch element and configured to engage with teeth on opposing sides of the virtual dental arch, wherein the virtual arch element extends from the one or more virtual tooth engagement structures in a lingual direction so that, when the one or more virtual tooth engagement structures are engaged with the teeth on opposing sides of the virtual dental arch, the virtual arch element spans across the palate and applies a virtual force on the teeth on opposing sides of the virtual dental arch in accordance with a stage of a treatment plan.

16. The method of claim 15, wherein forming the one or more virtual tooth engagement structures includes forming a shell that includes a number of cavities formed therein, wherein the number of cavities are shaped in accordance with one or more teeth of the virtual dental arch.

17. The method of claim 15, further comprising forming a second virtual arch element based on the virtual dental arch, wherein the second virtual arch element imparts a second virtual force to the virtual dental arch across the palate according to a second stage of the treatment plan.

18. The method of claim 15, wherein the virtual force is based on maintaining a predefined space between two teeth of the virtual dental arch or a virtual tooth and another feature of the virtual dental arch.

19. The method of claim 15, further comprising forming an arch element based on the virtual arch element and one or more tooth engagement structures based on the one or more virtual tooth engagement structures.

20. The method of claim 15, wherein forming the virtual arch element comprises forming a corrugated surface on the virtual arch element.

21. The method of claim 15, wherein forming the virtual arch element comprises forming the virtual arch element such that it is releasable from the one or more virtual tooth engagement structures.

22. The method of claim 15, wherein forming the virtual arch element comprises forming one or more reinforcement structures on a lingual side of the virtual arch element.

23. A method of forming a dental appliance, comprising:
defining a width of a virtual arch element to be wider than an arch width across a palate of a virtual dental arch; and forming the virtual arch element coupled to one or more virtual tooth engagement structures, the one or more virtual tooth engagement structures configured to engage with teeth on opposing sides of the virtual dental arch, wherein the virtual arch element extends from the one or more virtual tooth engagement structures in a lingual direction so that, when the one or more virtual tooth engagement structures are engaged with the teeth on opposing sides of the virtual dental arch, the virtual arch element spans across the palate of the virtual dental arch and imparts a virtual force across the palate of the virtual dental arch in accordance with a stage of a treatment plan.

24. The method of claim 23, wherein forming the virtual arch element comprises forming the one or more virtual tooth engagement structures to extend around to a buccal side of the virtual dental arch.

25. The method of claim 23, wherein forming the virtual arch element includes forming a corrugated surface on the virtual arch element.

* * * * *